United States Patent [19]

Diaz et al.

[11] Patent Number: 5,745,489
[45] Date of Patent: *Apr. 28, 1998

[54] BUFFERED CROSSPOINT MATRIX FOR AN ASYNCHRONOUS TRANSFER MODE SWITCH AND METHOD OF OPERATION

[75] Inventors: Felix V. Diaz; Jack H. Stanley, both of Plano, Tex.

[73] Assignee: DSC Communications Corporation, Plano, Tex.

[*] Notice: The term of this patent shall not extend beyond the expiration date of Pat. No. 5,537,400.

[21] Appl. No.: 680,830

[22] Filed: Jul. 16, 1996

Related U.S. Application Data

[63] Continuation of Ser. No. 228,598, Apr. 15, 1994, Pat. No. 5,537,400.

[51] Int. Cl.$^6$ .................................................. H04J 3/02
[52] U.S. Cl. ............................................ 370/395; 370/412
[58] Field of Search ........................... 370/60, 60.1, 53, 370/54, 58.1, 58.2, 58.3, 66, 61, 94.1, 85.6, 63, 65.5, 351, 389, 390, 391, 392, 395, 396, 397, 398, 399, 412, 413, 414, 415, 416, 417, 418, 421, 428; 340/826, 827

[56] References Cited

U.S. PATENT DOCUMENTS

| | | | |
|---|---|---|---|
| 5,126,999 | 6/1992 | Munter et al. | 370/60 |
| 5,260,935 | 11/1993 | Turner | 370/60 |
| 5,278,830 | 1/1994 | Kudo | 370/94.1 |
| 5,537,400 | 7/1996 | Diaz et al. | 370/60 |

OTHER PUBLICATIONS

Praveen Goli, et al., "Performance of a Crosspoint Buffered ATM Switch Fabric", IEEE 1992, pp. 0426–0435.
H. Jonathan Chao, et al., "A Large–Scale Multicast Output Buffered ATM Switch", IEEE 1993, pp. 34–41.
Chao et al., "A Large–Scale Multicast Output Buffered ATM Switch", 1993, pp. 34–41.
Goli et al, "Performance of a Crosspoint Buffered ATM Switch Fabric", 1992 pp. 426–435.

*Primary Examiner*—Wellington Chin
*Assistant Examiner*—Huy D. Vu
*Attorney, Agent, or Firm*—Baker & Botts, L.L.P.

[57] ABSTRACT

A buffered crosspoint matrix (20) of an asynchronous transfer mode switch (10) includes a plurality of switching elements (38) for receiving and switching segments containing asynchronous transfer mode cells. Each switching element (38) receives segments at a plurality of multicast/routing elements (52). Each multicast/routing element generates insert enable signals for each segment to route segments to selected crosspoints (58) of a plurality of vertical bar elements (54). Each vertical bar element (54) includes a plurality of queuing systems (90) for receiving and storing segments within an associated common buffer area (94). Segments are prioritized according to class of service and segment locations within the common buffer area (94) are stored in subqueues (104) according to their corresponding class of service. Each queuing system (90) performs a first phase contention resolution tournament to determine an oldest segment of those segments at the head of the subqueue (104) list. An output selector (114) performs a second phase contention resolution tournament by determining a most aged segment from the oldest segments within each queuing system (90). The most aged segment is switched out of the corresponding vertical bar element (54). The buffered crosspoint matrix can be expanded by interconnecting switching elements (38) within a crossbar via expansion inputs (51). An alternative expansion method interconnects crossbars in a three stage matrix.

12 Claims, 17 Drawing Sheets

GFC: Generic Flow Control
VPI: Virtual Path Identifier
VCI: Virtual Channel Identifier
PT: Payload Type
CLP: Cell Loss Priority
HEC: Header Error Control

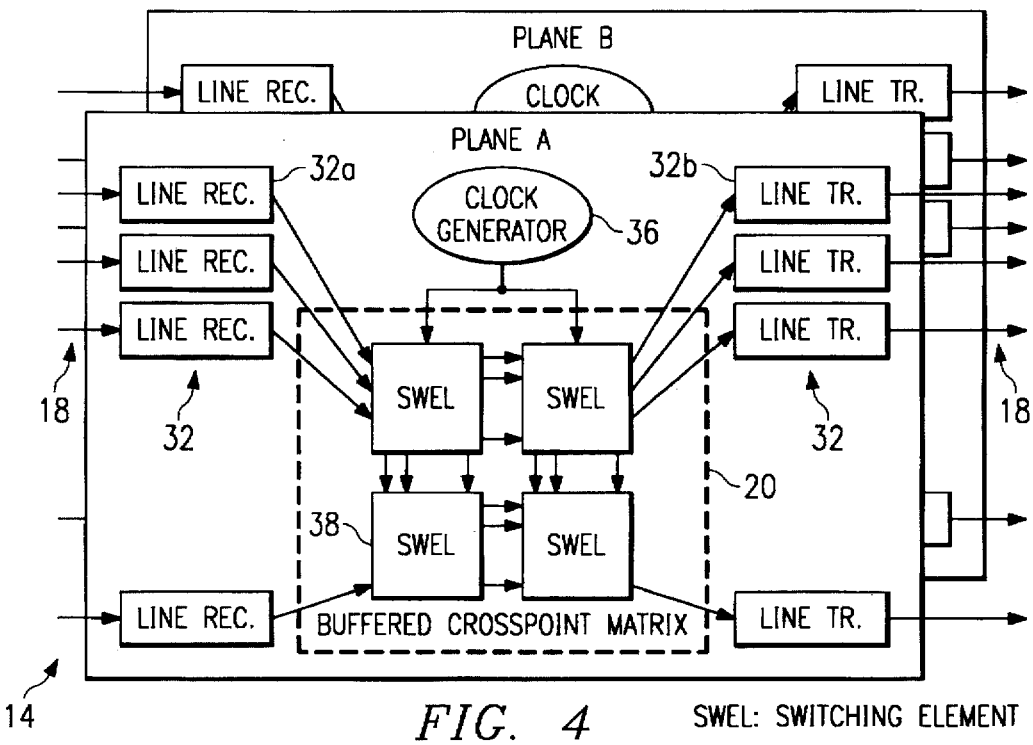

SWEL: SWITCHING ELEMENT

IE: Insert Enable
CR: Contention Resolution

MCN: MultiCast Number
I/G: Individual/Group Address

BUFFERED CROSSPOINT MATRIX FOR AN ASYNCHRONOUS TRANSFER MODE SWITCH AND METHOD OF OPERATION

RELATED APPLICATIONS

This application is a continuation of application Ser. No. 08/228,598, filed Apr. 15, 1994 by Felix V. Diaz and Jack H. Stanley, entitled "Buffered Crosspoint Matrix for an Asynchronous Transfer Mode Switch and Method of Operation," now U.S. Pat. No. 5,537,400, issued Jul. 16, 1996.

This application is related to U.S. patent application Ser. No. 07/693,553, filed Apr. 29, 1991, entitled "Method and Apparatus for a High Speed Asynchronous Transfer Mode Switch."

TECHNICAL FIELD OF THE INVENTION

The present invention relates in general to telecommunication transmission networks and more particularly to a buffered crosspoint matrix for an asynchronous transfer mode switch and method of operation.

BACKGROUND OF THE INVENTION

Two basic functions of any asynchronous transfer mode switch are contention resolution and buffering of contending cells. In ATM switching architectures, no attempt is made to find a time slot for an arriving cell that is mutually convenient to the inlet and outlet where the cell is to be switched. Thus, output contention will necessarily occur among cells arriving simultaneously for the same destination. Discarding cells that cannot be delivered due to output contention is not acceptable; therefore, buffering must be provided for the contending cells.

The two most distinct characteristics of any ATM switch are the location of the buffers and the means for identifying and resolving output contentions among cells. Many architectures that have been devised suffer from drawbacks in operation. For example, an input buffer architecture has limited throughput, performs multicasting with difficulty, and requires a global contention resolution tournament that makes expansion highly complex. In output buffer architectures, high performance and complex queuing disciplines are not easily achieved. A hybrid input/output buffer architecture resolves some performance limitations of the above designs but adds additional hardware complexity and does little to improve multicasting implementation. In shared memory architectures on the other hand, memory access bottlenecks occur and implementation complexities increase. Therefore, it is desirable to have an ATM switching architecture with an improved buffering technique, multicasting capabilities, a contention resolution tournament that is easily expandable, and improve results in reduction of cell discarding.

From the foregoing, it may be appreciated that a need has arisen for an ATM switching architecture that has an improved contention resolution tournament for identifying and resolving output contentions among incoming cells. A need has also arisen for an improved buffering discipline that stores contending cells and reduces the possibility of cell discarding. Further, a need has arisen for an ATM switching architecture that can effectively discriminate between segments of classes of service with different switching delay requirements, and that can measure the switching delay experienced by each class of service and can modify it dynamically to meet the expected switching delay performance of each class.

SUMMARY OF THE INVENTION

In accordance with the present invention, a buffered crosspoint matrix for an asynchronous transfer mode switch and method of operation are provided which substantially eliminate or reduce disadvantages and problems associated with conventional telecommunication switches.

According to an embodiment of the present invention, there is provided a buffered crosspoint matrix for an asynchronous transfer mode switch that includes a plurality of switching elements where each switching element has a plurality of horizontal bar elements and vertical bar elements. Associated with the horizontal bar elements, there are multicast/routing elements for receiving segments containing asynchronous transfer mode cells where each multicast/routing element is associated with an input to the switching element and a horizontal bar element. Each multicast/routing element routes the segments to one or more of a plurality of vertical bar elements within each switching element where each vertical bar element is associated with an output from the switching element. The segments received from the multicast/routing elements are enqueued in a queue associated with the crosspoint at the intersection between a horizontal and a vertical bar element. At each switching interval, each vertical bar element selects one segment from all the segments enqueued in the plurality of crosspoints along the vertical bar. Each vertical bar selects the segment that has been in the vertical bar element the longest amount of time according to a segment aging algorithm. Segment aging is affected by the class of service of the segment where different classes of service age at different rates according to a priority given to the classes of service.

The apparatus and method of the present invention provide various technical advantages over conventional telecommunication switches. For example, one technical advantage is in prioritizing segments according to a class of service description that includes switching delay priority. Another technical advantage is to have different classes of service age at different rates. Another technical advantage is in calculating the age of each segment to determine an oldest segment for output transmission. Other technical advantages are readily apparent to one skilled in the art from the following figures, descriptions, and claims.

BRIEF DESCRIPTION OF THE DRAWINGS

For a more complete understanding of the present invention thereof, reference is now made to the following description taken in conjunction with the accompanying drawings, wherein like reference numerals represent like parts, in which:

FIGS. 3a–d illustrate examples of segments carried through the asynchronous transfer mode switch;

FIG. 4 illustrates a block diagram of a switching subsystem of the asynchronous transfer mode switch;

DETAILED DESCRIPTION OF THE INVENTION

Figure 1A:
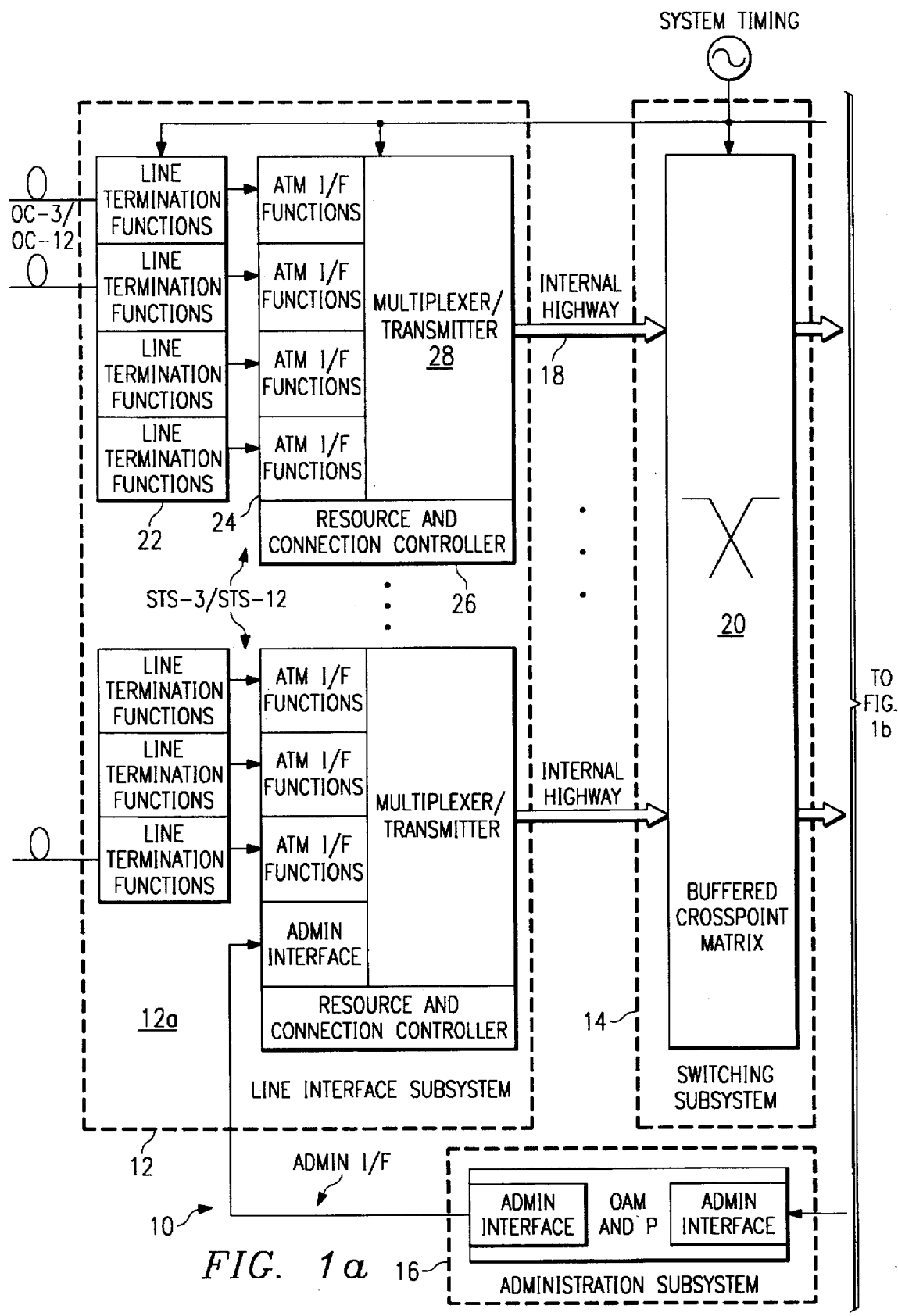
FIG. 1a–b illustrate a block diagram of an asynchronous transfer mode switch.
Figure 1B:
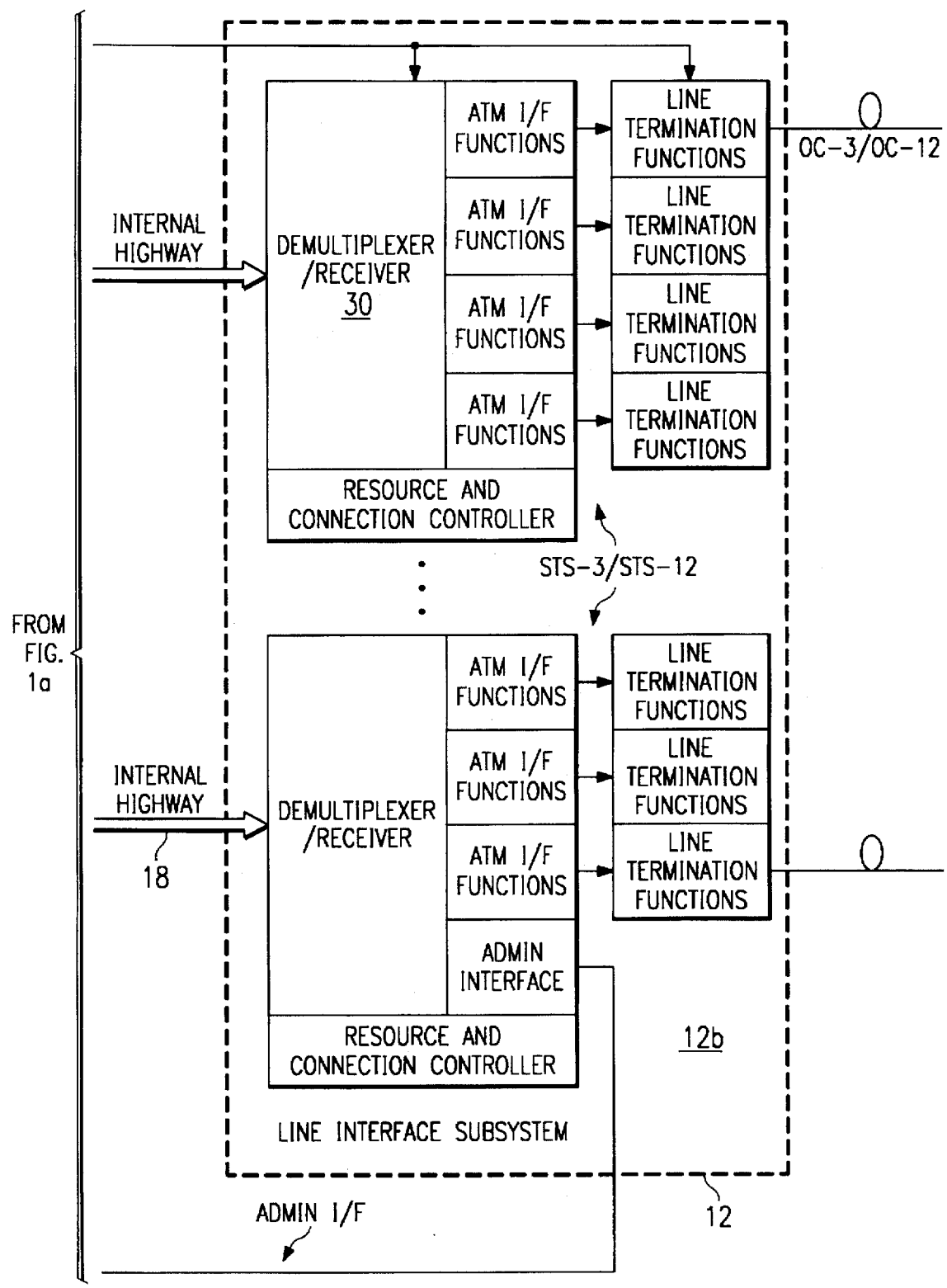

FIG. 1a–b are a block diagram of an asynchronous transfer mode (ATM) switch 10 for use in a telecommunications network. ATM switch 10 includes three major subsystems—a line interface subsystem 12, a switching subsystem 14, and an administration subsystem 16. Line interface subsystem 12 couples to switching subsystem 14 by internal highways 18. Internal highways 18 and line interface subsystem 12 provide for bidirectional information flow. For clarity purposes, line interface subsystem 12 is shown with an input side 12a separated from an output side 12b. Information flows within switching subsystem 14 in a unidirectional manner from input side 12a to output side 12b of line interface subsystem 12.

Input side 12a of line interface subsystem 12 terminates external signals and processes them for switching before being sent into a buffered crosspoint matrix 20 of switching subsystem 14. Output side 12b collects the switched signals from switching subsystem 14 and processes them before they are sent back into the outgoing transmission facility. Line interface subsystem 12 includes line terminations 22, ATM interfaces 24, resource and connection controllers 26, multiplexers/transmitters 28 on input side 12a, and demultiplexers/receivers 30 on output side 12b.

Line terminations 22 perform the optical to electrical conversion for external signals at input side 12a and the electrical to optical conversion of external signals at output side 12b. Optical signals are preferably at the OC-3 or OC-12 rate and the electrical signals are preferably at the STS-3c or STS-12c rate, respectively. ATM interface 24 performs ATM layer related functions.

Figure 2:
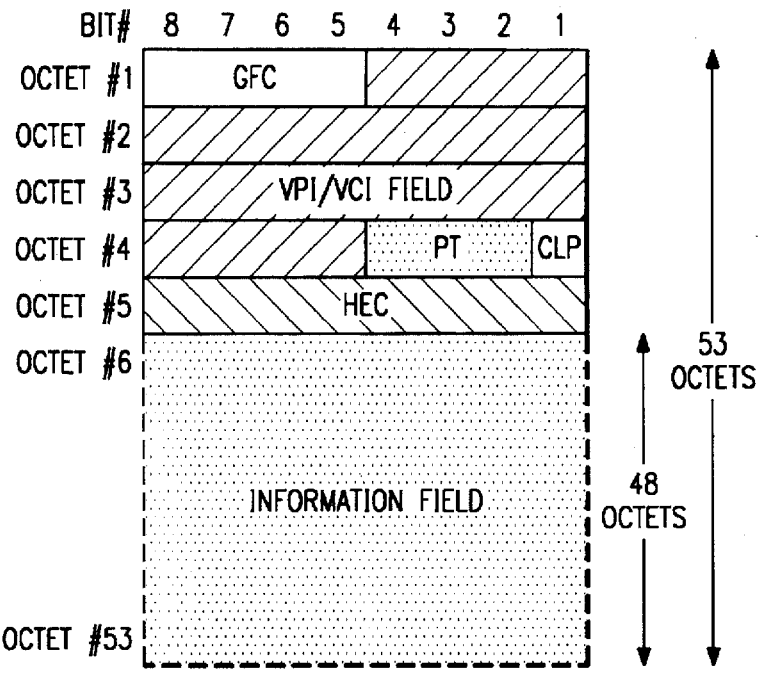
FIG. 2 illustrates an asynchronous transfer mode cell.

ATM interface 24 receives/transmits the electrical signal from line termination 22 for appropriate processing. ATM interface 24 generates a segment for every incoming valid ATM cell or internal message for multiplexing by multiplexer/transmitter 28. FIG. 2 shows an example of an ATM cell. An ATM cell is composed of a five octet header field and a 48 octet information field that carries the ATM user information. ATM interface 24 generates a segment from this ATM cell.

FIGS. 3a–d show a layout for a segment generated by ATM interfaces 24. A segment is a 64 octet packet broken into an 8 octet header, a 55 octet payload, and a single octet trailer. An incoming ATM cell is inserted into octet positions 10 to 62 of an available segment by ATM interface 24, where octets 8 and 9 of the segment are reserved. Header information for the segment is filled by ATM interface 24 with information derived from the VPI/VCI field of the ATM cell. The segment is subsequently switched according to information in its header. In output side 12b of line interface subsystem 12, ATM interfaces 24 extract ATM cells from their respective segments before being mapped into a synchronous payload envelope of an outgoing transmission facility. A segment may alternatively carry internal control communications for local use by switching subsystem 24.

Figure 3A:
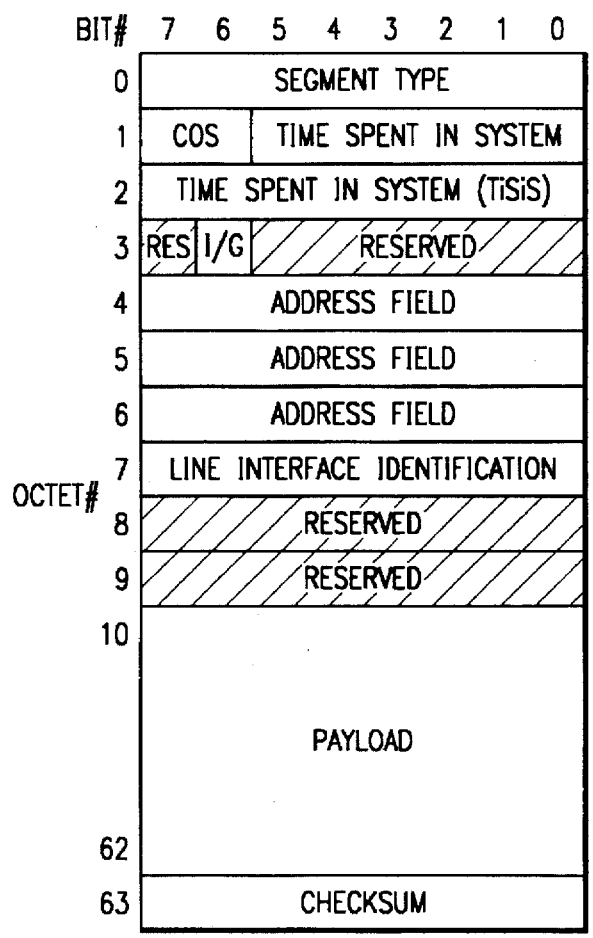

FIG. 3a depicts the partitioning for the segment. The segment type field of the segment identifies one of three types of segments—user, internal, or idle. A user segment carries data generated external to ATM switch 10, for instance an ATM cell. An internal segment carries local information sourced and linked by ATM switch 10, for instance a maintenance message. An idle segment carries no information and is used to fill ATM switch 10 when no data-carrying segments are generated. The segment type field also uniquely identifies the beginning of new segments through a segment synchronization pattern. This is accomplished by encoding the segment type field as a group of control codes in an 8B/10B block code. Since the sequence of 10 bits in the control codes cannot be repeated by the remainder of the segment, the start of the segment is uniquely and instantaneously identified. Table I shows how the segment type field is implemented prior to encoding into block code form.

TABLE I

| Segment Type | Control Code |
| --- | --- |
| User segment, matrix plane A | XXXXX001 |
| User segment, matrix plane B | XXXXX010 |
| Internal segment, matrix plane A | XXXXX100 |
| Internal segment, matrix plane B | XXXXX111 |
| Idle segment | 00000000 |

The Class of Service (CoS) field identifies one of various classes of service supported by ATM switch 10. By identifying separate classes of service, ATM switch 10 can guarantee minimum quality of service expectations to its users regardless of the number of users or services supported by the network at any given time. Two parameters that determine quality of service are cell loss probability and cell switching delay. The classes of service supported by ATM switch 10 are prioritized from highest to lowest according to these two parameters.

For discussion purposes, four classes of service are described as being supported by ATM switch 10—class 0 (delay sensitive, loss sensitive traffic), class 1 (delay sensitive, loss tolerant traffic), class 2 (less delay sensitive, loss tolerant traffic), and class 3 (delay insensitive, loss sensitive traffic). Class 0 is subject to the lowest switching delay of all four classes and is the last to be discarded during switch congestion. Class 0 is used for priority traffic including network management information or premium services such as circuit emulation. Class 1 experiences the second lowest switching delay but is subject to discard during traffic congestion. Class 1 can be used for instance to carry video traffic. Class 2 is subject to longer switching delays and discard during periods of congestion. Class 2 can be used for services such as bulk data. Class 3 is subject to the longest switching delays but is only discarded during periods of extreme congestion. Class 3 is suitable for data transfers.

The Time Spent in System (TiSiS) field is a 14 bit number in two's complement format representing the time spent by this segment in switching subsystem 14. The TiSiS field is set to 0 when the segment is generated. The TiSiS field is modified within switching subsystem 14 according to a time stamping algorithm to be discussed. The TiSiS field is used to determine the age of the segment. The age of the segment is weighted by the Class of Service to which the segment belongs. For example, a time sensitive segment ages faster than a less time sensitive segment such that the TiSiS field of the former is larger than that of the latter even if both segments entered switching subsystem 14 at the same time.

The Individual/Group (I/G) field determines whether the destination of the segment is a single outlet or multiple outlets of switching subsystem 14. An individual address is used for point-to-point connections. A group address is used in point to multi-point connections. The Address Field contains the individual or group destination addresses for the segment. The format of the Address Field varies according to how the bit of the I/G field is set.

FIG. 3b shows the Address Field for a 0 in the I/G field indicating individual destination addresses. The field is partitioned into three 8 bit destination address tags, one per each matrix stage of a three stage matrix in switching subsystem 14. Each destination address tag chooses the specific outlet for each matrix stage within switching subsystem 14. For a single stage implementation, only destination address tag 1 is used.

FIG. 3c shows the Address Field for a 1 in the I/G field indicating group destination addresses. The field is partitioned into three 10 bit multicast numbers (MCN), one per each matrix stage of a three stage matrix in switching subsystem 14. A translation of the MCN at each stage produces the information for the target outlet or outlets. For a single stage implementation, the MCN takes up the entire 30 bit Address Field.

Returning to the segment layout of FIG. 3a, the Line Interface Identification (LIID) field identifies the specific unit within line interface subsystem 12 where the segment is to be delivered. The LIID field is used when more than one unit of the line interface subsystem 12 share one internal highway 18. The Checksum field is used in the detection of faulty or misdelivered segments.

The 55 octet Payload field is available for the transport of all forms of information. ATM cells are placed intact into octet positions 10 to 62 of the Payload field of the segment. Octets 8 and 9 of the segment are reserved. Internal segments make special use of the payload field for sending information and messages to components of ATM switch 10.

FIG. 3d shows the format of the payload field for an internal segment. The payload field is partitioned into a Command/Message (C/M) field, an Addressable Entity Type (AET) field, a Destination System Number (DSN) field, and a Source System Number (SSN) field. The C/M field carries the type of administrative message or indication that can include loopback, hardware alarm, table update, and congestion notification. The AET field identifies the class of device for which the segment is intended. The DSN field determines the specific device within the class of devices identified by the AET field. Internal segments are recognized by the recipient device through matching of the AET and DSN fields. Once a match is found, the recipient device extracts the internal segment for further processing. The SSN field identifies the addressable entity that generated the internal segment.

Referring back to FIG. 1a–b, multiplexer/transmitter 28 performs the multiplexing of segments from multiple ATM interfaces 24 into a single segment stream for transmission onto internal highway 18. Multiplexer/transmitter 28 performs line encoding of the segment stream, parallel to serial conversion, and front end functions such as electrical to optical conversion for coupling to internal highway 18.

Conversely, demultiplexer/receiver 30 at output side 12b identifies and extracts segments from internal highway 18. Demultiplexer/receiver 30 performs front end functions such as optical to electrical conversion off of internal highway 18, line decoding of the segment stream, and serial to parallel conversion. Demultiplexer/receiver 30 demultiplexes segments from internal highway 18 for delivery to one or more outgoing ATM interfaces 24.

Internal highways 18 link line interface subsystem 12 to switching subsystem 14, preferably through serial optical links. Internal highway 18 is formed by multiplexing in time a continuous stream of assigned and idle segments without discontinuity between them. Idle segments are inserted by multiplexer/transmitter 28 when there is no data segment to transmit. Preferably, an idle segment is an all zero segment with an all ones checksum. An assigned segment carries valid data, whether it be user information or an internal message. Internal highway 18 is the same for both incoming and outgoing directions.

Resource and connection controller 26 is responsible for most layer management and plane management functions. Resource and connection controller 26 preferably runs off a CPU base unit and can be shared by a number of ATM interfaces 24. Resource and connection controller 26 processes alarms originating from other parts of ATM switch 10 and communicates with other controllers and administration subsystem 16 for the exchange of alarms and other maintenance information. Resource and connection controller 26 cooperates with administration subsystem 16 for the implementation of congestion control and resource management procedures.

Administration subsystem 16 provides the overall control for ATM switch 10. Administration subsystem 16 is responsible for establishing connections through switching subsystem 14, guaranteeing the required availability of the system, allocating switch resources amongst its users, and collecting valuable data for analysis and processing concerning the status or history of ATM switch 10. Administration subsystem 16 provides management for connection, call, fault/alarm, performance, system, and congestion for ATM switch 10.

Switching subsystem 14 performs the routing of segments through buffered crosspoint matrix 20 between input side 12a and output side 12b of line interface subsystem 12. FIG. 4 is a block diagram of switching subsystem 14. Switching subsystem 14 includes line receive/transmit units 32, separated as line receivers 32a and line transmitters 32b, a buffered crosspoint matrix 20, and a clock generator 36. Buffered crosspoint matrix 20 includes one or more switching elements 38 for cross connecting segments between line receivers 32a and line transmitters 32b.

Switching subsystem 14 is preferably made of two identical planes, A and B. Input ports in both planes are attached to internal highways 18 through line receivers 32a. Output ports connect to internal highways 18 through line transmitters 32b. An internal highway 18 is used for each port of each plane of switching subsystem 14. Internal highways 18 in the incoming and outgoing direction need not be phased synchronized to each other, although all internal highways 18 use a switching subsystem 14 frequency reference. This reference is provided by clock generator 36 equipped in both switching planes.

Line receive/transmit units 32 terminate a number of internal highways 18 in one of the two planes both in the receiving and transmitting directions. Thus, one line receive/transmit unit 32 has a number N of line receiver 32a and line transmitter 32b pairs. Line receiver 32a performs optical to electrical conversion of incoming signals on internal highway 18 at an input side of switching subsystem 14, serial to parallel conversion of the incoming segments, and decoding of the incoming data from block code to non return to zero (NRZ) code. At the output side, line transmitter 32b performs encoding of outgoing data from NRZ to block code, parallel to serial conversion of the outgoing segments, and electrical to optical conversion prior to transmission onto internal highway 18 in the outgoing direction.

Figure 5:
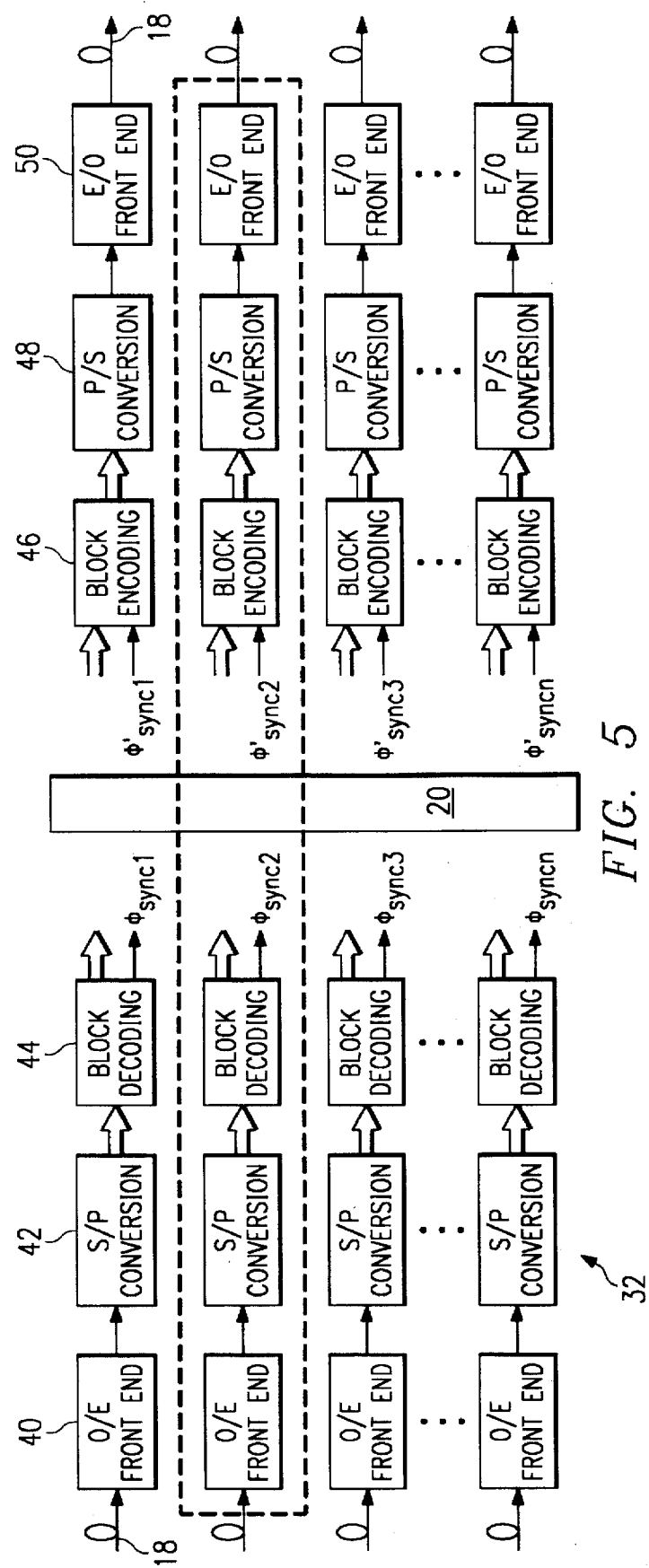
FIG. 5 illustrates a block diagram of a line receive/transmit unit within the switching subsystem.

FIG. 5 is a block diagram of line receive/transmit unit 32. Line receiver 32a portion of line receive/transmit unit 32 connects N internal highways 18 coming from multiplexer/transmitter 28 of input side 12a of line interface subsystem 12 to a number N of input ports of switching subsystem 14. Line receiver 32a includes an optical to electrical front end 40, a serial to parallel converter 42, and a block decoder 44. The outputs of line receiver 32a connect to the inputs of switching elements 38 at a first stage of buffered crosspoint matrix 20.

Optical to electrical front end 40 terminates the optical signal on internal highway 18 carrying the serial bit stream from line interface subsystem 12. The optical signal is converted into its electrical equivalent. Optical to electrical front end 40 performs filtering and bit sampling on the incoming bit stream to deliver a noise free, jitter free serial bit stream to serial to parallel converter 42.

Serial to parallel converter 42 converts the serial bit stream generated by optical to electrical front end 40 into a parallel format of continuous ten bit words of block encoded information equivalent to one octet of NRZ information. The continuous word sequence is delivered to block decoder 44.

Block decoder 44 converts the incoming block encoded segments into NRZ encoded segments. Block decoder 44 converts each ten bit word into one octet of decoded data and delivers successfully decoded non-idle segments to switching elements 38 at the first stage of buffered crosspoint matrix 20. Block decoder 44 identifies the beginning of new segments by the unique control pattern of the segment type field in the first octet of each segment. Upon detection of the arrival of the first octet of a new segment, block decoder 44 generates a synchronization flag, $\phi_{syncN}$, which indicates the arrival of a new segment at switching elements 38 of buffered crosspoint matrix 20. Block decoder 44 also identifies idle segments by their unique segment type discriminator. Block decoder 44 removes idle segments from the continuous word sequence. Only non-idle segments are inserted into switching elements 38. No synchronization flag is generated upon detection of idle segments.

For line transmitter 32b of line receive/transmit unit 32, outputs of buffered crosspoint matrix 20 are processed and connected to internal highways 18 leading to demultiplexer/receiver 30 of line interface subsystem 12. Line transmitter 32b performs segment processing through a block encoder 46, a parallel to serial converter 48, and an electrical to optical front end 50. Inputs to line transmitter 32b at block encoder 46 are connected to outputs of switching elements 38 at a first stage of buffered crosspoint matrix 20, or at a third stage for a buffered crosspoint matrix 20 that has multiple stages.

Block encoder 46 transforms the NRZ segment stream coming from buffered crosspoint matrix 20 into a block code suitable for transmission onto internal highway 18. Block encoder 46 receives the first octet of each segment along with a synchronization flag, $\phi_{syncN}$, issued by the outputting switching element 38. Block encoder 46 encodes the first octet of the segment, the segment type octet, as a control octet that has the unique code sequence of ten bits that cannot be repeated by a data octet. The remaining 63 octets of the segment are encoded as data octets by block encoder 46. If block encoder 46 receives no new segment arrival from buffered crosspoint matrix 20 at the beginning of a new switching cycle, block encoder 46 inserts an idle segment into the segment stream transmitted to line interface subsystem 12 over internal highway 18.

Parallel to serial converter 48 receives the block encoded segment from block encoder 46 and transforms the segment into a serial bit stream for transmission to electrical to optical front end 50.

Electrical to optical front end 50 converts the serial bit stream from parallel to serial converter 48 into an optical signal for transmission onto internal highway 18. Electrical to optical front end 50 performs signal shaping and line conditioning prior to outputting the optical signal onto internal highway 18.

Figure 6A:
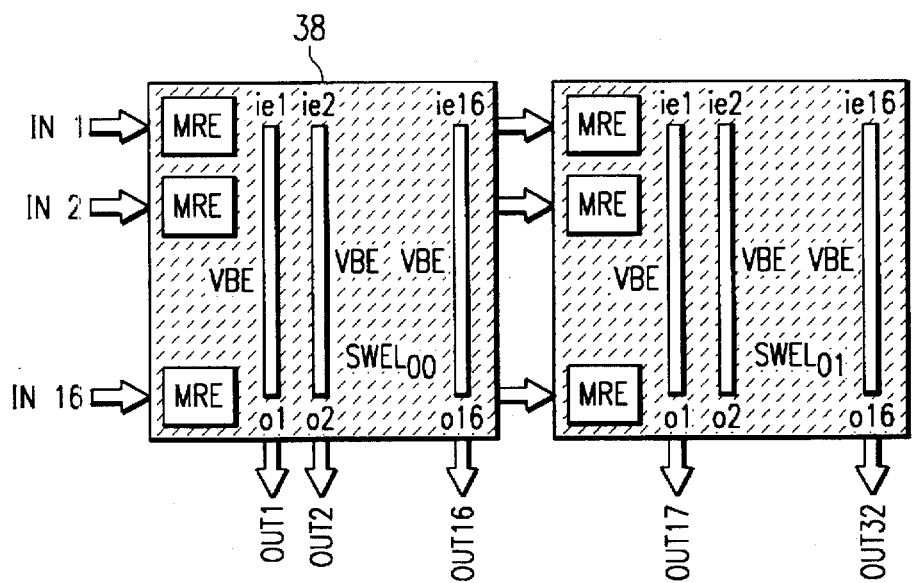
FIGS. 6a–c illustrate different switching element crossbar expansion configurations within a switching matrix of the switching subsystem.
Figure 6B:
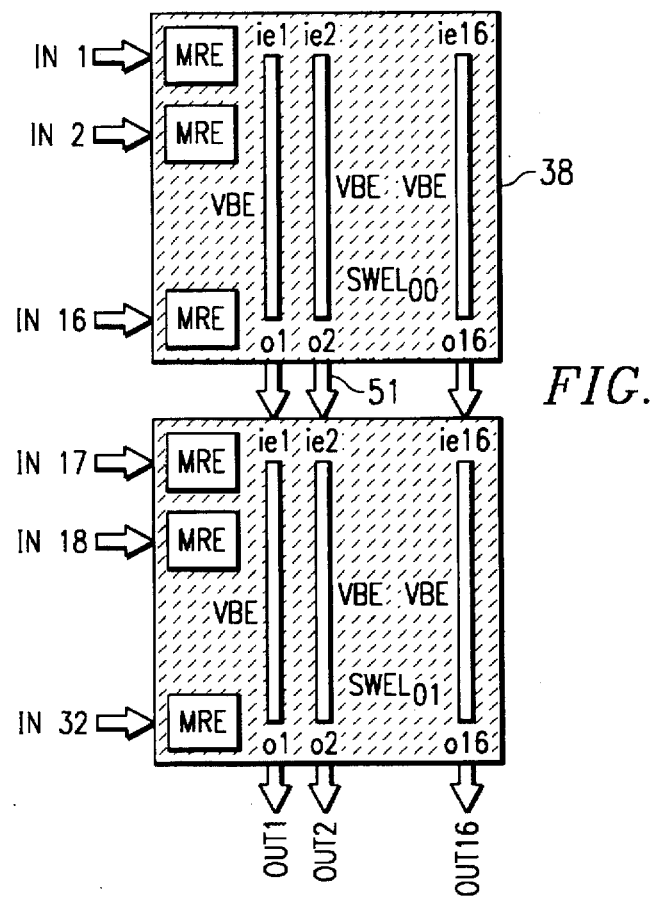
Figure 6C:
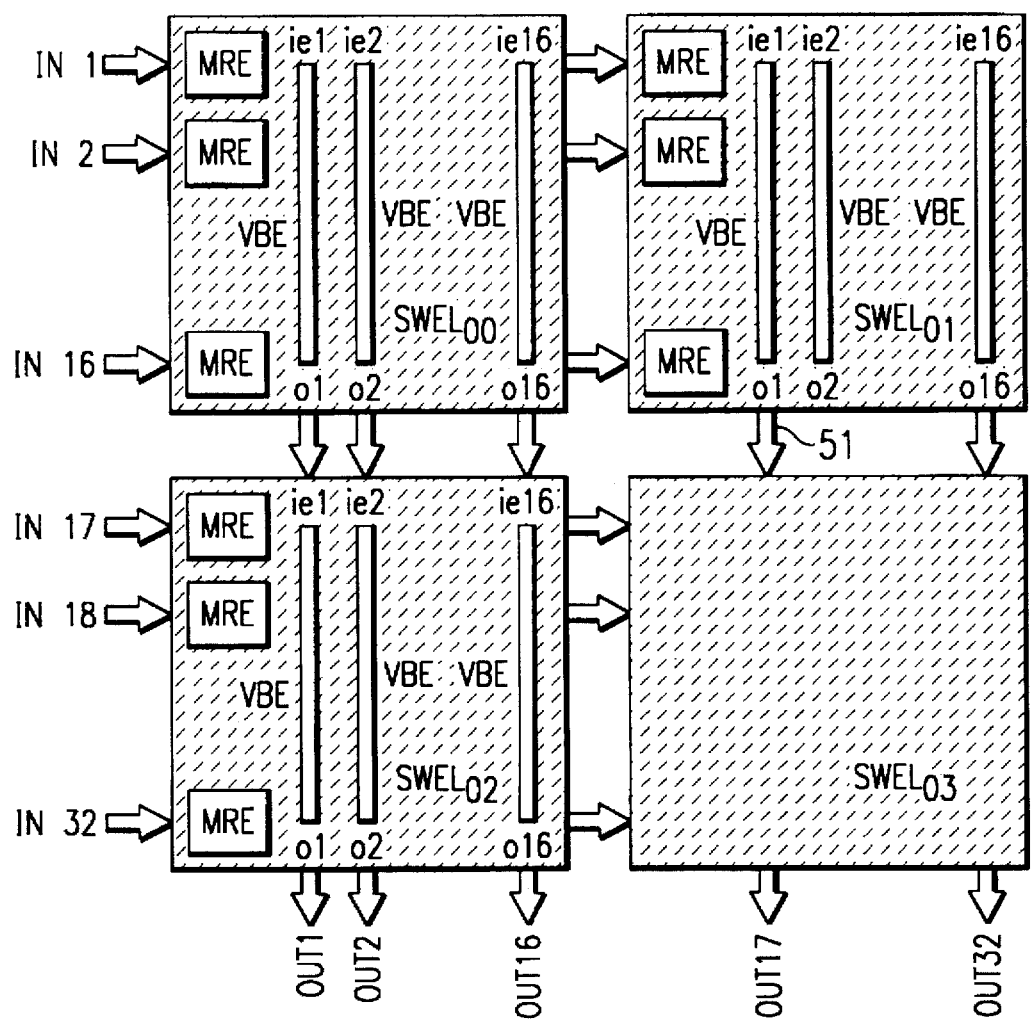

One or more switching elements 38 form a crossbar of buffered crosspoint matrix 20. Switching elements 38 can be combined to form an expanded crossbar of the matrix for increasing a number of inputs and outputs of a crossbar. FIGS. 6a-c show examples of how a 16 by 16 switching element 38 is used to form expanded crossbars. FIG. 6a shows how two 16 by 16 switching elements 38 are combined to form a 16 by 32 crossbar. FIG. 6b shows how two 16 by 16 switching elements 38 are rearranged to form a 32 by 16 crossbar. FIG. 6c shows how four 16 by 16 switching elements 38 are coupled to form a 32 by 32 crossbar. For horizontal expansion, each input of the crossbar is applied to the same input of each switching element 38 in the crossbar. For vertical expansion, each output of a switching element 38 is applied to a successive switching element 38 as an expansion input 51.

Figure 7:
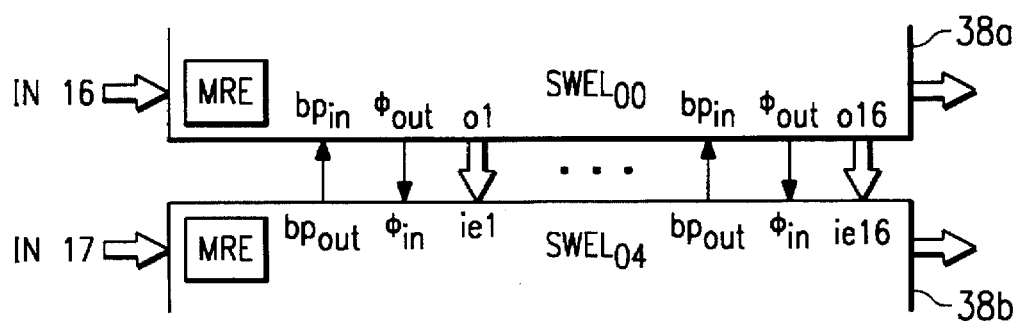
FIG. 7 illustrates crossbar expansion capabilities of the switching element.

FIG. 7 shows how vertical expansion is achieved for an expanded crossbar. The 16 outputs of switching element 38a are applied to corresponding expansion inputs of switching element 38b. Each output of switching element 38a is transmitted with a synchronization flag $\phi_{out}$. Switching element 38b transmits a back pressure signal bp$_{out}$ that indicates whether its expansion input is occupied. If the expansion input is not occupied, back pressure signal bp$_{out}$ enables switching element 38a to transmit its output and corresponding synchronization flag to switching element 38b. If the expansion input is occupied, back pressure signal bp$_{out}$ disables the transmission capabilities of switching element 38a until the expansion input becomes available for use. Vertical transmission of expansion inputs is performed independently at each output of switching element 38a.

Figure 8:
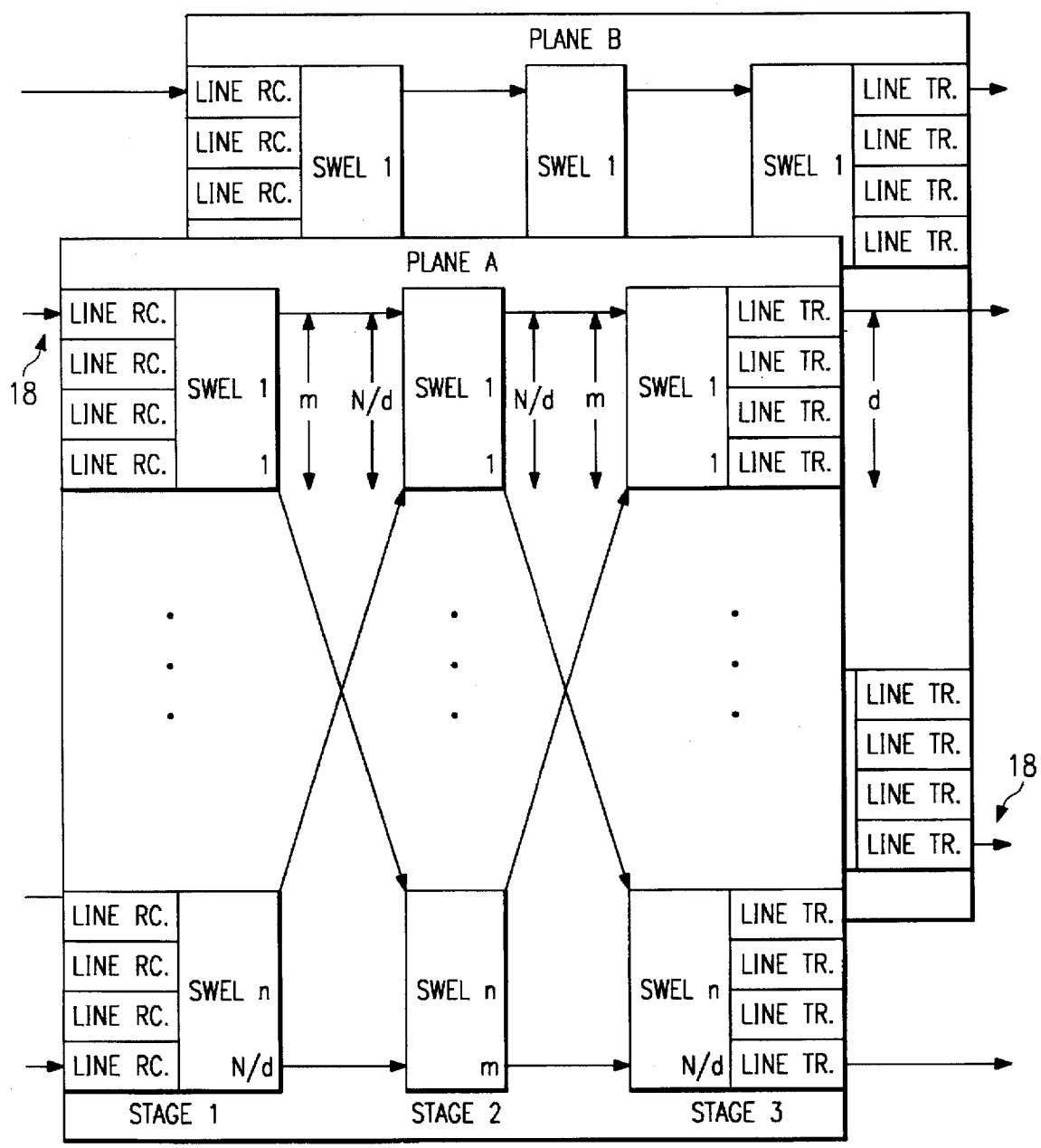
FIG. 8 illustrates a block diagram of a multistage switching matrix of the switching subsystem.

Buffered crosspoint matrix 20 is formed by switching elements 38 into a single stage or multiple stage matrix. Buffered crosspoint matrix 20 of FIG. 4 is shown in a single stage matrix configuration. FIG. 8 shows an example of buffered crosspoint matrix 20 formed into a three stage configuration. FIG. 8 shows one switching element 38 for each crossbar of buffered crosspoint matrix 20. The size of one plane for switching subsystem 14 has N inputs by N outputs. In stages one and three there are N/d switching elements 38, where d is the number of inputs to each switching element 38 in the first stage and the number of outputs from each switching element 38 in the third stage.

Switching elements 38 in stage one have a size of d inputs by m outputs. Switching elements 38 in stage three have a size of m inputs by d outputs. There are m switching elements 38 in stage two, where the size of a stage two switching element 38 is N/d inlets by N/d outlets.

The simplest matrix plane is a non-expansion plane in which d equals m which equals N/d. In most instances switching element 38 will have the same number of inputs as outputs. However, switching element 38 can be built to any practical size of d inputs and m outputs where d and m are different numbers as shown in FIGS. 6a and 6b. Matrix expansion can be provided by a switching element 38 with more outputs than inputs. Conversely, matrix concentration and multiplexing can be accomplished with switching element 38 having more inputs than outputs. A preferable size for switching element 38 is 16 inputs by 16 outputs. With that size, the maximum size three stage matrix that can be built is 256 by 256 ports.

Figure 9:
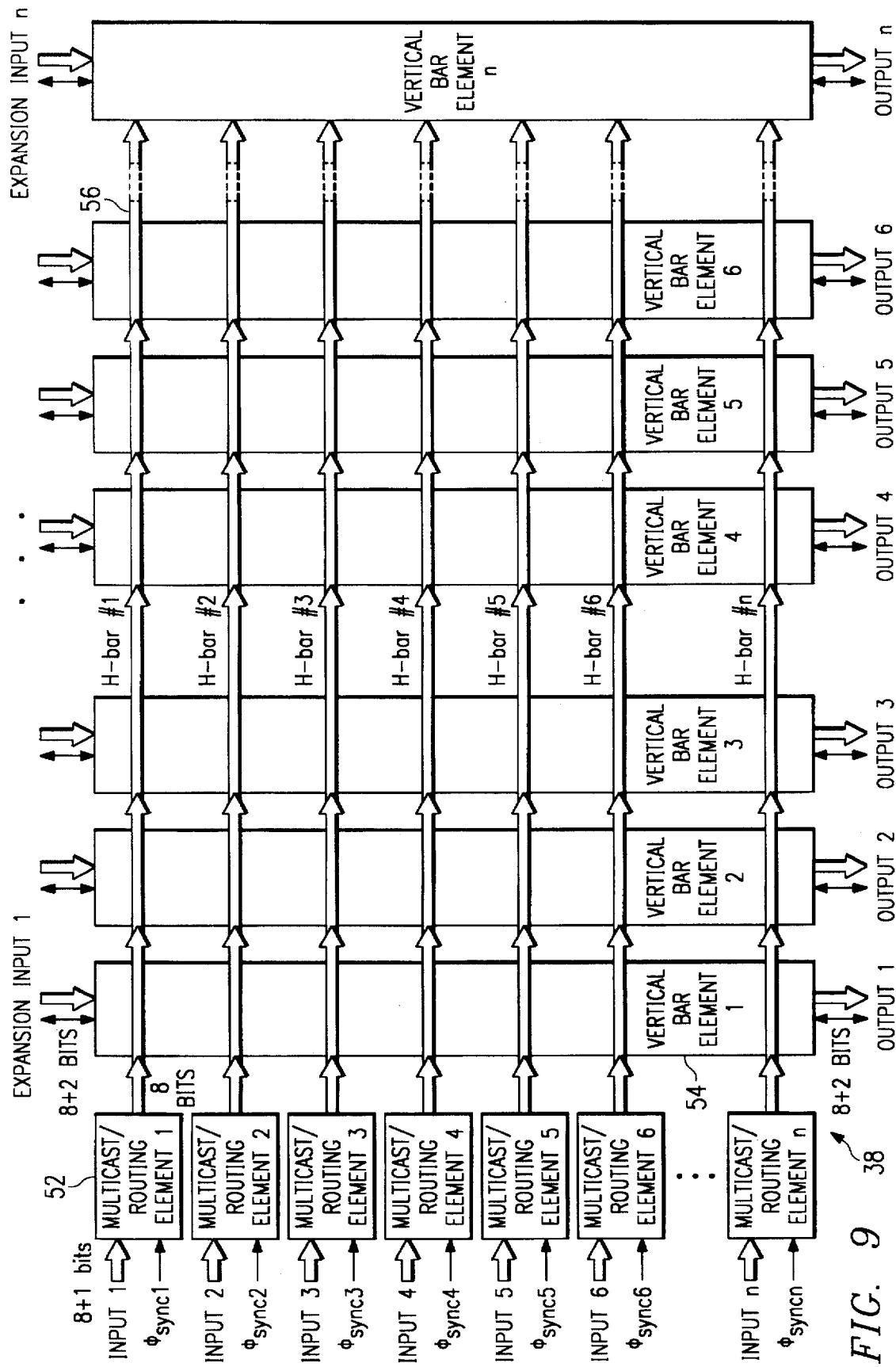
FIG. 9 illustrates a block diagram of a switching element of the switching matrix.

FIG. 9 is a block diagram of switching element 38. Switching element 38 includes a multicast/routing element 52 and a horizontal bar 56 for each input of switching element 38 and a vertical bar element 54 for each output of switching element 38. A crosspoint occurs at the intersection of each horizontal bar and vertical bar element. Multicast/routing element 52 passes segment octets to a particular vertical bar element 54 over a horizontal bar 56. Horizontal bar 56 is a physical bus connecting all inputs of the same number in all the vertical bar elements 54 in switching element 38. For instance, horizontal bar 56 number one ties input number one of vertical bar elements one, two, three, up to N together with the output of multicast/routing element 52 number one, such connections continuing sequentially.

Multicast/routing element 52 supplies horizontal bar bus 56 with an 8 bit octet of a segment and inserts enable signals for each vertical bar element 54 of switching element 38. On every switching cycle, multicast/routing element 52 activates one insert enable flag per switching element 38 row when a valid segment carrying the address of an output of switching element 38 is decoded by multicast/routing element 52. Multiple insert enable flags may be activated for group addresses.

Figure 10:
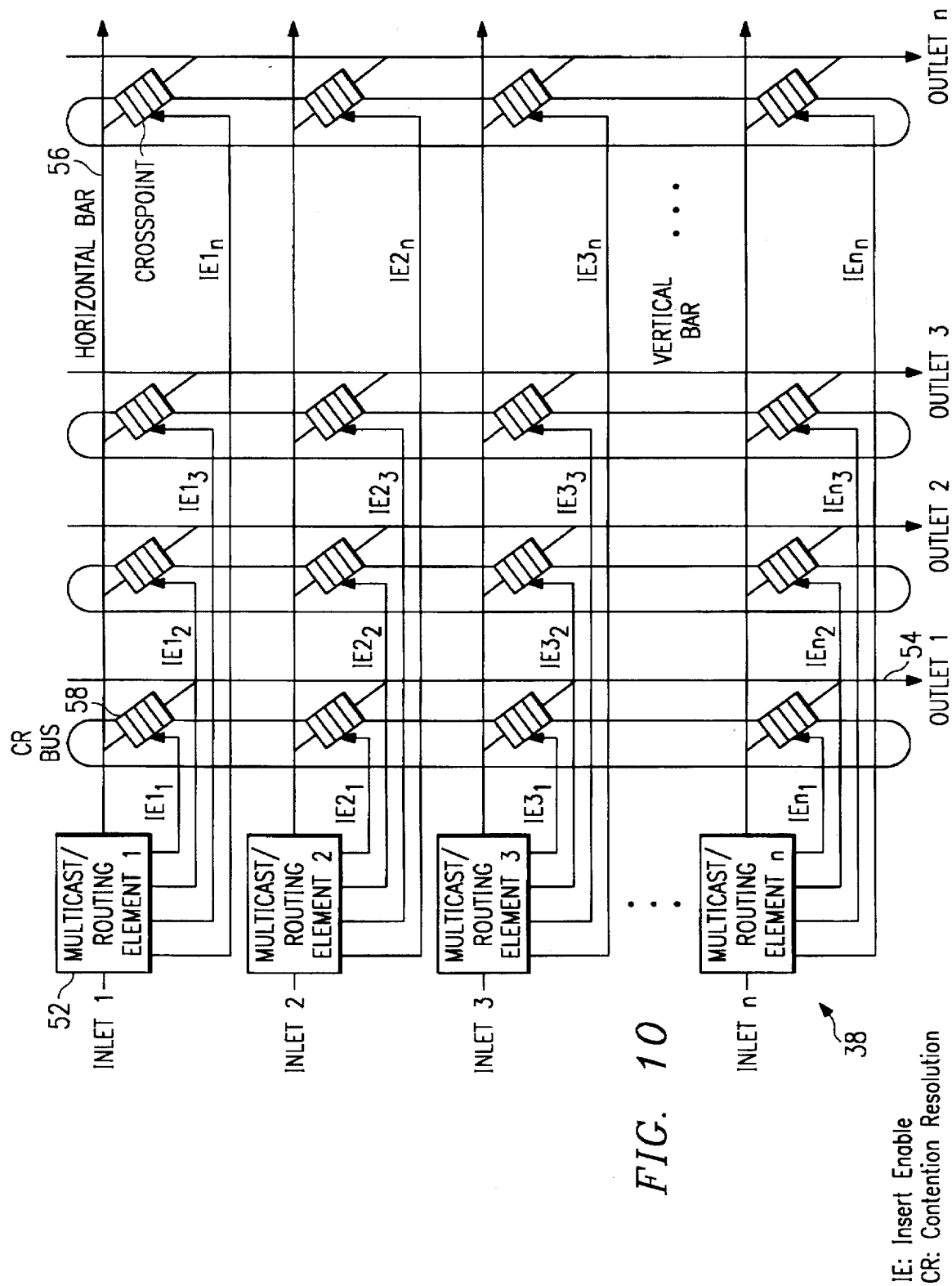
FIG. 10 illustrates a block diagram of a switching element of the switching matrix.

FIG. 10 shows how multicast/routing element 52 supplies an insert enable signal to each vertical bar element 54 of switching element 38. Switching element 38 is shown with $N^2$ crosspoints 58 distributed along N horizontal bars 56 and N vertical bar elements 54. A single crosspoint 58 connects one horizontal bar 56 to one vertical bar 54. Queuing takes place at each crosspoint 58. Incoming segments flow along horizontal bar 56, are queued in selected enabled crosspoints 58, and delivered to corresponding vertical bar elements 54.

Figure 11:
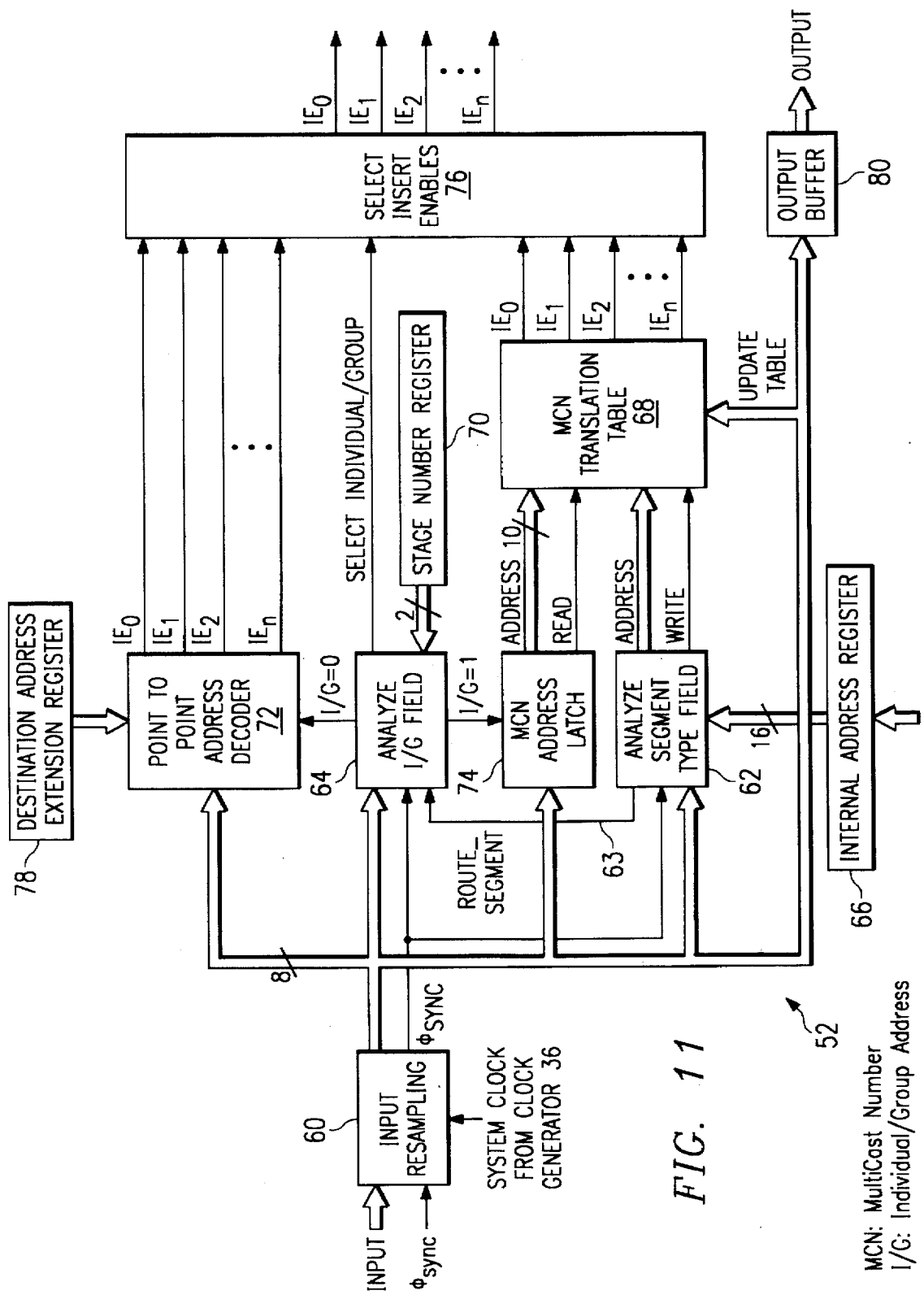
FIG. 11 illustrates a block diagram of a multicast/routing element of the switching element.

FIG. 11 is a block diagram of multicast/routing element 52. Multicast/routing element 52 receives an input and a synchronization flag, $\phi_{sync}$, from block decoder 44 of line receiver 32a of line receive/transmit unit 32. In the case of an intermediate stage switching element 38, multicast/routing element 52 receives an input and synchronization flag from the output of a vertical bar element 54 of a previous stage of buffered crosspoint matrix 20. Multicast/routing element 52 implements the routing function for each non-idle segment arriving at its input. Multicast/routing element 52 switches individual segments to the specified vertical bar elements 54 by analyzing the I/G field and address field in the segment headers.

Inputs received at multicast/routing element 52 need to be resampled because the interconnecting distances between switching elements 38 of buffered crosspoint matrix 20 may be of the same order of magnitude as the wavelength of the input signal. An input resampler 60 determines the phase relationship of the incoming word sequence to a resampling system clock provided by clock generator 36. A finite state machine in input resampler 60 performs the task of comparing the transitions of the incoming data to the phases of the system clock on a bit by bit basis.

Figure 12:
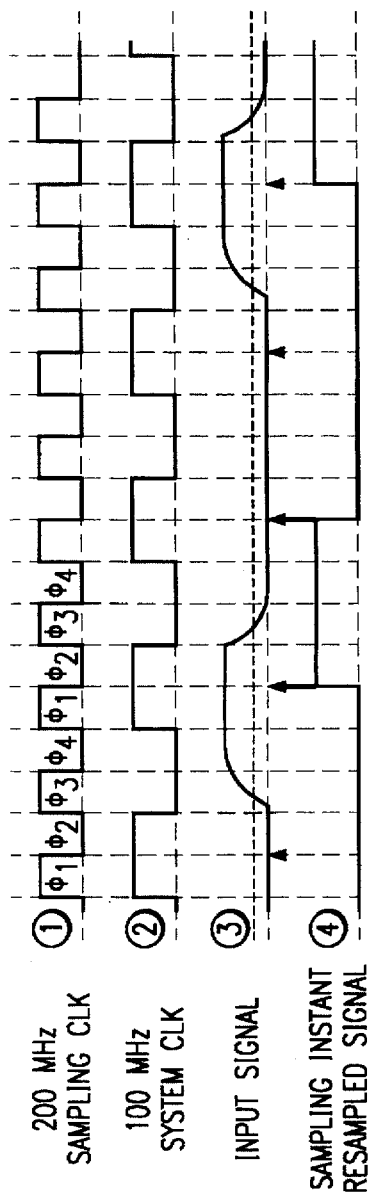
FIG. 12 illustrates a timing diagram of resampling performed by the multicast/routing element.

FIG. 12 shows how the incoming bit stream is resampled. For illustration purposes, a 2× sampling clock, a 200 MHz clock, is received by input resampler 60 from clock generator unit 36. With a 2× sampling clock, one bit time period can be divided into four sampling phases $-\Phi_1$, $\Phi_2$, $\Phi_3$, and $\Phi_4$. A single level threshold is established midway between the logic zero and logic one levels of the input signal. A transition in the data of the input signal is detected when the threshold is crossed by the data in either direction, from low level to high level or high level to low level. When a transition occurs, the present time phase is recorded. In the example of FIG. 12, a low to high transition is detected during phase $\Phi_3$ and a high to low transition occurs during $\Phi_3$ of the next bit period. Based on the time of occurrence of the data transitions, the best resampling instant is determined. Since transitions occur during phase $\Phi_3$, the optimal sampling instant is concluded to be at the end of phase $\Phi_1$.

While bit resynchronization is needed to successfully recover the incoming bit stream, segment synchronization is not necessary at the input side of multicast/routing element 52. A synchronization flag $\phi_{sync}$ identifying the beginning of a new segment travels in parallel with a first octet of the segment. Furthermore, the inter switching element 38 transmission links for both data and synchronization flag $\phi_{sync}$ are of the same length. Therefore, the synchronization flag is in phase with the arrival of the first octet of the segment.

Input resampler 60 also includes a small amount of storage, in the order of a few bytes, to compensate for signal distortion introduced by the resampling of jittery incoming signals. Also, storage is needed since the routing of incoming segments relies on the analysis of fields in the segment header such as the internal destination system number and the destination tag number, which are separated by several bytes.

After input resampling, interpretation of the segment type is performed by an analyze segment type field block 62. Two types of segments may be received by multicast/routing element 52 and interpreted by analyze segment type field block 62—a user or internal segment. A user segment will be identified from an internal segment by the code carried in the Segment Type octet.

The user segment is always forwarded by multicast/routing element 52 from its input to its output. Analyze segment type field block 62 decodes the incoming segment type as a user segment and sends a route segment signal 63 to an analyze individual/group (I/G) field block 64. Analyze I/G field block 64 routes the user segment by processing the I/G field from the header of the segment.

An internal segment, on the other hand, may be destined for this particular multicast/routing element 52 in which case the internal segment may contain a multicast number (MCN) translation table update. Alternatively, internal segment may be destined for another addressable switch entity of switching subsystem 14, in which case the segment will be processed transparently by multicast/routing element 52 the same way a user segment is processed.

When an incoming segment is decoded as an internal segment, analyze segment type field block 62 reads the command, addressable entity type, and destination system number fields of the segment. Analyze segment type field block 62 also reads the internal address assigned to this particular multicast/routing element 52. The internal address for this multicast/routing element 52 is hardwired and available to analyze segment type field block 62 through internal address register 66. If the addressable entity type field is not that of a multicast/routing element 52 or if the destination system number of the segment does not match the assigned internal address for this multicast/routing element 52, then the segment is not destined for this particular multicast/routing element 52 and is subsequently switched to the output of multicast/routing element 52.

If the addressable entity type is that of a multicast/routing element 52 and the destination system number matches the assigned internal address for this multicast/routing element 52, then the internal segment is destined for this multicast/routing element 52. The command field of the segment is set to MCN table update and the segment payload will include the MCN translation lookup table address to be modified followed by the new lookup table contents. Analyze segment type field block 62 extracts both address and data fields from the internal segment for updating of an MCN translation table 68.

Analyze I/G field block 64 interprets the I/G field on the header of incoming segments. Analyze I/G field block 64 is synchronized with the arrival of a valid segment as indicated by the synchronization flag $\phi_{SYNC}$ received from input resampler 60. Individual/group interpretation begins upon receiving route segment signal 63 from analyze segment type field block 62. Analyze I/G field block 64 determines whether the incoming segment is to be routed as a point-to-point segment or as a point-to-multipoint segment. Point-to-point segment routing occurs if the I/G field in the segment header is set to zero. Point-to-multipoint segment routing occurs if the I/G field is set to one.

Analyze I/G field block 64 has access to a stage number register 70 that contains the stage number of buffered crosspoint matrix 20 to which this multicast/routing element 52 belongs. The stage number for this multicast/routing element 52 is read from the stage number register and a suitable self-routing address field for that stage is selected from the segment's header. In the case of a point-to-point segment, an 8 bit destination tag 1 field (see FIG. 3b) is selected if the stage number for this multicast/routing element 52 is one, a destination tag 2 field is selected if the stage number is two, or a destination tag 3 field is selected if the stage number is three. For a point-to-point segment, analyze I/G field block 64 selects the 8 bit destination tag and passes a strobe enable signal to point-to-point address decoder 72.

If the segment being analyzed is part of a point-to-multipoint connection, the I/G field block 64 selects a 10 bit field from the segment's header, namely MCN 1, MCN 2, or MCN 3 (see FIG. 3c) depending on whether the stage number for this multicast/routing element 52 is stage one, two, or three, respectively. For a point-to-multipoint segment, the selected 10 bit MCN and strobe enable signal are passed to an MCN address latch 74. The 10 bit MCN number is latched and used to access MCN translation table 68.

Point-to-point address decoder 72 and MCN translation table 68 generate insert enable (IE) signals for activation of one or more crosspoints 58 within vertical bar elements 54. Analyze I/G field block 64 generates a select signal for a select insert enable block 76 to determine whether insert enable signals pass to vertical bar elements 54 from point-to-point address decoder 72 or from MCN translation table 68.

The destination tag of the point-to-point segment is partitioned into two fields. In one embodiment the first field, the address extension, is made of the four most significant bits of the tag. In that embodiment the four least significant bits of the destination tag represent the individual output number of the switching element 38 where the segment needs to be routed. Point-to-point address decoder 72 tests the address extension field of an incoming segment against the contents of a destination address extension register 78. The address extension field is used in the case of multiple switching elements 38 in a crossbar of buffered crosspoint matrix 20 for additional expansion capabilities to identify a specific switching element 38 within the crossbar. If the value in the address extension field does not match that in destination address extension register 78, then the segment is destined for a companion switching element 38 within the crossbar and no routing is performed by this multicast/routing element 52.

If the value in the address extension field matches that in destination address extension register 78, point-to-point address decoder 72 decodes the outlet number field. A single insert enable signal is obtained by decoding the appropriate outlet number. The insert enable signal obtained is activated at the output of point-to-point address decoder 72. The insert enable signal propagates through select insert enable block 76 to the output of multicast/routing element 52 and subsequently to one of vertical bar elements 54 of switching element 38, prompting the connection of a corresponding crosspoint 58 on horizontal bar 56 and selected vertical bar element 54. The selected vertical bar element 54 inserts the segment into the enabled crosspoint 58 queue.

Figure 13:
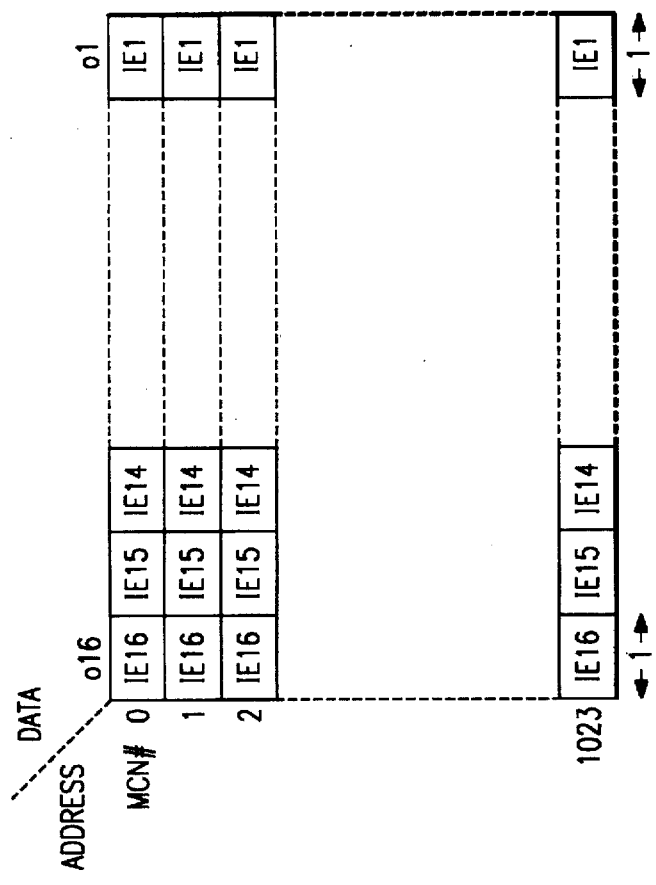
FIG. 13 illustrates a multicast number translation table used within the multicast/routing element.

MCN address latch 74 stores the MCN number of a point-to-multipoint segment for access to MCN translation table 68. For group addresses, the appropriate multicast number in the address field of the header of the segment is used to obtain insert enable signals for one or more vertical bar elements 54 of switching element 38 through MCN translation table 68. MCN translation table 68 is made of one entry for each MCN defined in switching element 38. The entry contains one insert enable flag for each vertical bar element of switching element 38. FIG. 13 shows an example of a layout for MCN translation table 68.

The insert enable flags within the entry are set to a logic one if the multicast connection identified by the MCN number needs to be routed to the indicated output of switching element 38 and are set to logic zero if the connection is not to be made. Any combination of one or more insert enable flags may be set in an active multicast connection. For an active multicast connection, the insert enable signals read from MCN translation table 68 are passed through select insert enable block 76. If group selection is identified by analyze I/G field block 64, the insert enable flags from MCN translation table 68 are output to one or more vertical bar elements 54 of switching element 38. The segment is then copied into all crosspoints 58 of horizontal bar 56 of switching element 38 which have been enabled by an active insert enable signal.

Select insert enable block 76 selects under the control of analyze I/G field block 64, the group of insert enable flags from point-to-point address decoder 72 or MCN translation table 68 according to the individual/group designation. In those switching intervals when no segment is forwarded from this multicast/routing element 52, the select insert enable block 76 will output insert enable signals with a logic zero value.

Multicast/routing element 52 includes an output buffer 80 that performs an elastic store with the capacity for a few octets of segment data. Output buffer 80 stores the segment octets received from input resampler 60 prior to transmission to the appropriate vertical bar element 54. Output buffer 80 realigns the phases of the insert enable signals and the segment headers such that both the insert enables and the first octet of an outgoing segment are transmitted at exactly the same time towards vertical bar elements 54.

Vertical bar element 54 of switching element 38 contains all the crosspoints 58 of a single vertical bar of the switching element 38 crossbar. As segments arrive from a plurality of multicast/routing elements 52, vertical bar element 54 inserts the segments into their respective crosspoint 58 queues, performs time stamping of incoming and outgoing segments, and implements the multiqueuing discipline for each crosspoint 58 in the vertical bar. Vertical bar element 54 also implements a contention resolution tournament between the segments in all the crosspoint queues and selects a tournament winning segment. The winning segment is extracted from its crosspoint queue and forwarded by vertical bar element 54 towards the next stage of buffered crosspoint matrix 20.

Figure 14A:
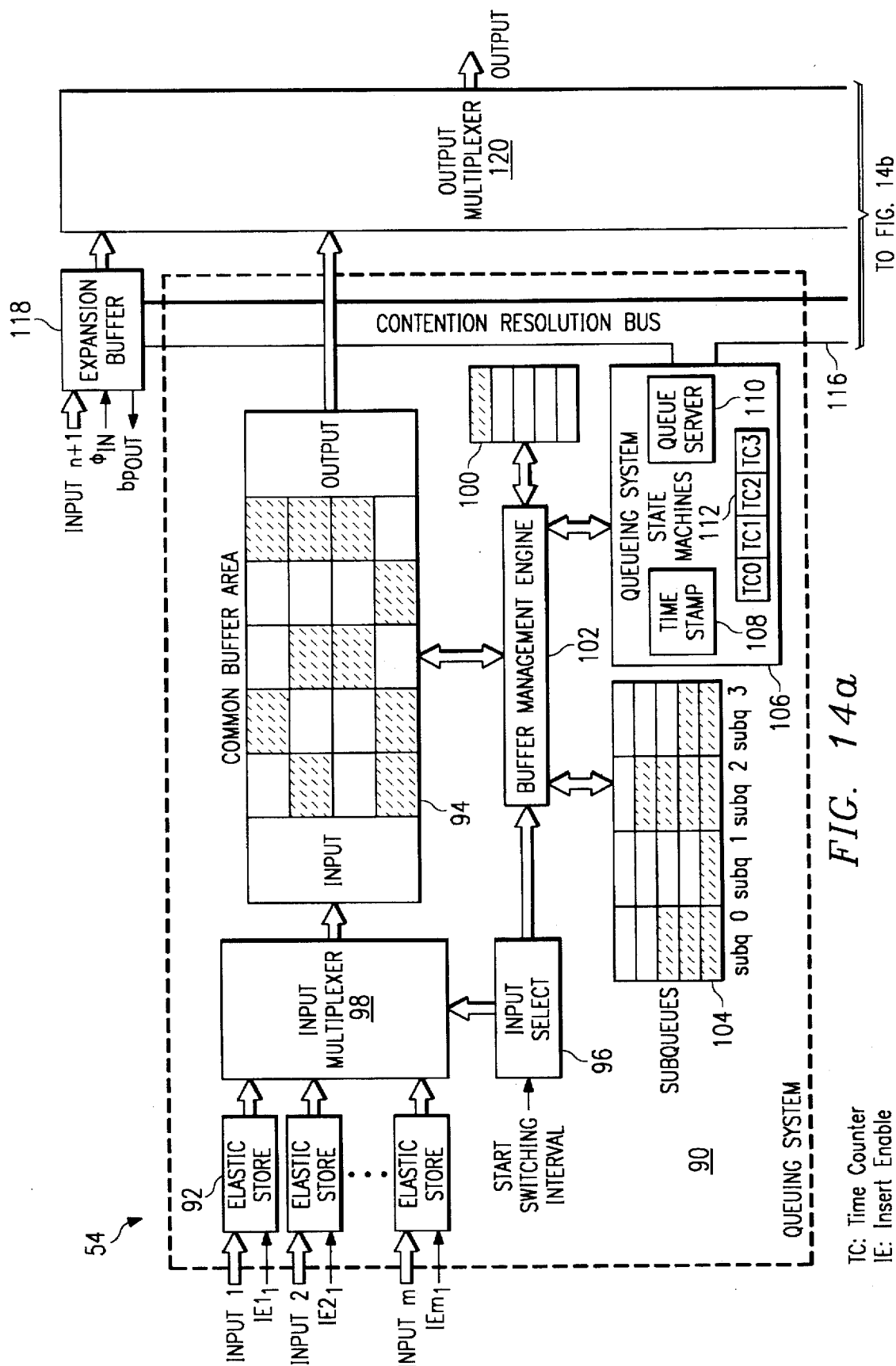
FIGS. 14a–b illustrate a block diagram of a vertical bar element of the switching element.
Figure 14B:
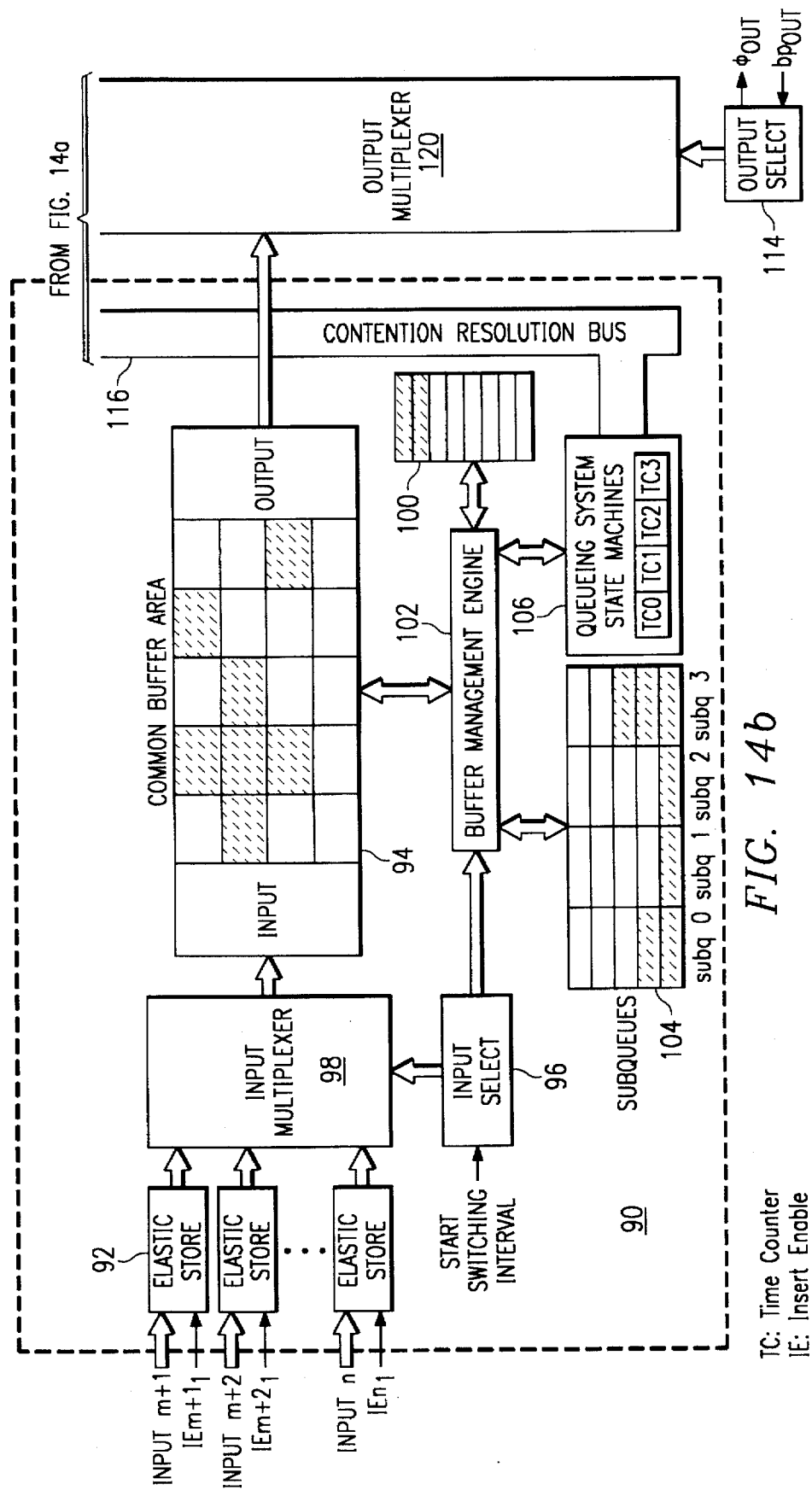

FIGS. 14a–b are block diagrams of vertical bar element 54. One switching element 38 contains N vertical bar elements 54 similar to that shown in FIG. 14 to provide N outputs of switching element 38. Vertical bar element 54 includes any number of identical queuing systems 90, up to one queuing system per input of the vertical bar element. Vertical bar element 54 of FIGS. 14a–b show two queuing systems 90 as an example, though a vertical bar element could contain any number of queuing systems in order to receive the total number of inputs from multicast/routing elements 52. For the vertical bar element 54 of FIGS. 14a–b, each queuing system 90 serves a number of individual crosspoint queues, such as M inputs where M is a variable ranging from one input to all the inputs of vertical bar element 54.

Queuing system 90 includes elastic stores 92 for receiving each input and corresponding insert enable signal from multicast/routing elements 52. Elastic stores 92 provide the initial crosspoint 58 queuing mechanism for vertical bar element 54. Elastic storage allows the arrival of segments at different inputs of vertical bar element 54 to occur any time between switching intervals. In this way, the switching timing, provided by clock generator unit 36, is detached from segment arrivals. The provision of elastic stores 92 in switching element 38 relaxes the synchronization requirements on the interconnections between stages of buffered crosspoint matrix 20 or between inputs of switching elements 38, which due to the elastic stores do not need to be synchronized to each other.

Elastic stores 92 permit segments arriving to vertical bar element 54 to be phase aligned with the start of a switching interval before being inserted into a common buffer area 94. The insertion of segments into common buffer area 94 is implemented by an input selector 96 in a time staggered and fair manner. Input selector 96 reads the insert enable (IE) flags generated for each input at input buffers 92 when a segment is present at the corresponding input port. An active insert enable signal is an indication from the multicast/ routing element 52 in the same horizontal bar that a segment is waiting to be written into the crosspoint queue of vertical bar element 54. In response to the insert enable signals, input selector 96 places all segments waiting in the elastic stores of vertical bar element 54 into common buffer area 94.

In the case of multiple inputs sharing the same common buffer area, the order in which segments are placed into the common buffer area 94 during the same switching interval by input selector 96 is not the order of their arrival. The placement order is chosen in such a way that no input is favored over another. Since the queues of up to M inputs may be implemented by a single shared memory system (i.e., common buffer area 94) in a common queuing system, it is imperative that each of the M inputs is given the same number of opportunities to be the first inserting its segment into the queue as are given the other inputs sharing the common queuing system. This is a fairness issue affecting the overall switching performance of switching subsystem 14 and avoids favoring certain inputs over other inputs.

Figure 15:
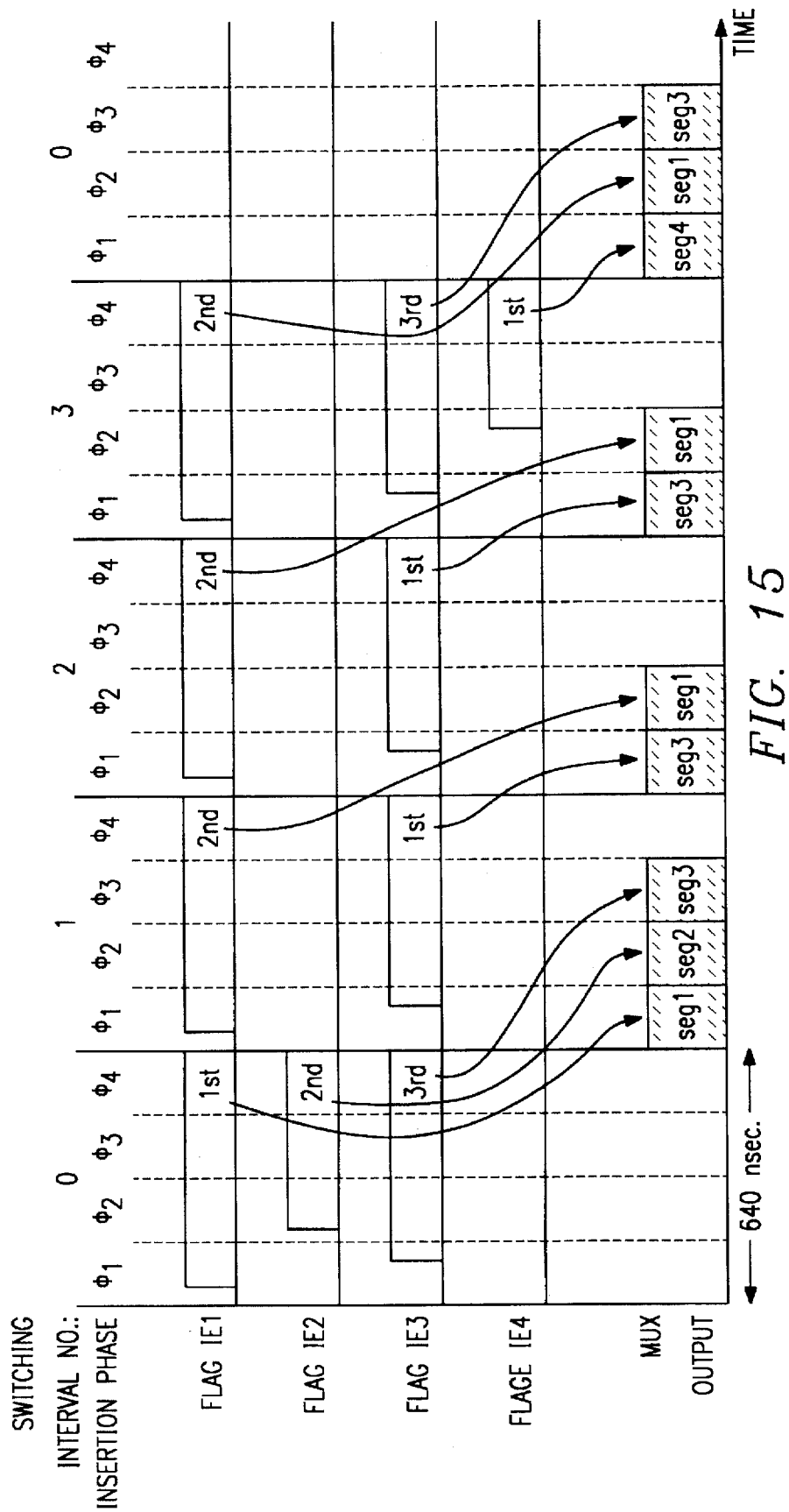
FIG. 15 illustrates a timing diagram of an input selection performed by the vertical bar element.

FIG. 15 shows a timing diagram of how a fair input selection scheme is implemented by queuing system 90. The timing diagram of FIG. 15 represents the case where four inputs may enter queuing system 90. The switching intervals for vertical bar element 54 are numbered cyclically zero, one, two, and three. One switching interval is the time that it takes to switch one segment. During each switching interval, up to four segments may arrive at the inputs serviced by input selector 96. Thus, up to four segments may need to be written into common buffer area 94 in four insertion phases during one switching interval. The insertion phases are $\Phi_1$, $\Phi_2$, $\Phi_3$, and $\Phi_4$. One segment is entered into common buffer area 94 in each phase.

Multicast/routing elements 52 feeding input buffers 92 of queuing system 90 may raise their insert enable flags any time during one switching interval. It is assumed that consecutive flags of one multicast/routing element 52 are raised up at about the same time during each switching interval. Under this assumption, if the segments of the queuing system 90 were to be chosen in the order of arrival of their flags, then some inputs such as those raising their flags towards the beginning of the switching interval would be consistently entered into the queue first resulting in an inequity.

To resolve this inequity, a cyclical entry order has been devised. During the first switching interval, the insertion order would be input one first, then input two, then input three, and finally input four. For the next switching interval, the insertion order for segments rotates such that input two is first, then input three, then input four, and finally input one. Similarly, during the next switching interval, the order of insertion is input three, input four, input one, and input two. Finally during the next switching interval, the insertion order is input four, input one, input two, and input three. Though a cyclical insertion order is described, other insertion schemes may be used to ensure that each input has a fair chance of being the first segment inserted into common buffer area 94 during a switching interval.

Input selector 96, according to the cyclical insertion order scheme, chooses the order of insertion for the next switching interval from the flags raised at the end of each interval. Therefore, from FIG. 15, input selector 96 would choose the segments from inputs one, two, and three in that order at the end of switching interval number zero. Input number four does not have a segment available during interval zero. Those three segments are buffered during phases $\Phi_1$, $\Phi_2$, and $\Phi_3$ of switching interval number one, respectively. During interval one, only two segments, one from input one and one from input three, arrive at vertical bar element 54. In accordance with the insertion criteria, the segment from input three is inserted into common buffer area 94 before the segment from input one. The insertion of these two segments is shown at the start of switching interval two. Between the time of arrival of these segments and the time of their insertion into common buffer area 94, the segments are buffered in their respective input buffers 92. The arriving segment from input three is selected over the segment from input one during switching interval two. The two segments are inserted into common buffer area 94 in the chosen order during the subsequent switching interval.

At the start of every insertion, input selector 96 selects the input number of the segment about to be inserted into an empty buffer of common buffer area 94 and activates an input multiplexer 98 towards the selected input. The first memory location of the empty buffer where the segment will be written is a buffer pointer obtained from a free buffer pointer FIFO 100 of available buffer pointers maintained and continually updated by a buffer management engine 102. The buffer pointer is obtained by input selector 96 through an assigned request operation from the head of free buffer pointer FIFO 100. The buffer pointer becomes the initial common buffer area 94 write address during the segment write process. The write address is incremented by input selector 96 after every segment octet is written into common buffer area 94.

Queuing system 90 is composed of a number of subqueues 104, one subqueue for each class of service (CoS) supported by ATM switch 10. Subqueues 104 are formed by linking the buffer pointers used to write the incoming segments into common buffer area 94. The linking of the pointers is performed by the buffer management engine 102. Input selector 96 passes to buffer management engine 102 the class of service number of the segment being presently inserted into common buffer area 94. Buffer management engine 102 takes the buffer pointer passed by FIFO 100 and inserts this pointer into the back of an appropriate subqueue 104 according to the class of service of the segment corresponding to the buffer pointer. Subqueues 104 are separated into multiple first come first serve subqueue stacks according to the different class of service options provided by ATM switch 10. If the incoming segment had a class of service number of zero for instance, buffer management engine 102 would insert the buffer pointer at the back of subqueue zero.

Common buffer area 94 is a random access memory device where multiple segments are stored, i.e. queued, before being transmitted. Common buffer area 94 services a number of crosspoints 58 or inputs of vertical bar element 54 by storing the segments of multiple inputs in a single shared memory system. Common buffer area 94 is divided into sixty-four octet buffer partitions where each buffer is capable of holding one segment. Buffers are identified by pointers linking them to one of four subqueues 104 in queuing system 90 when the buffers are occupied or to a free buffer pointer FIFO 100 when the buffers are available.

Figure 16:
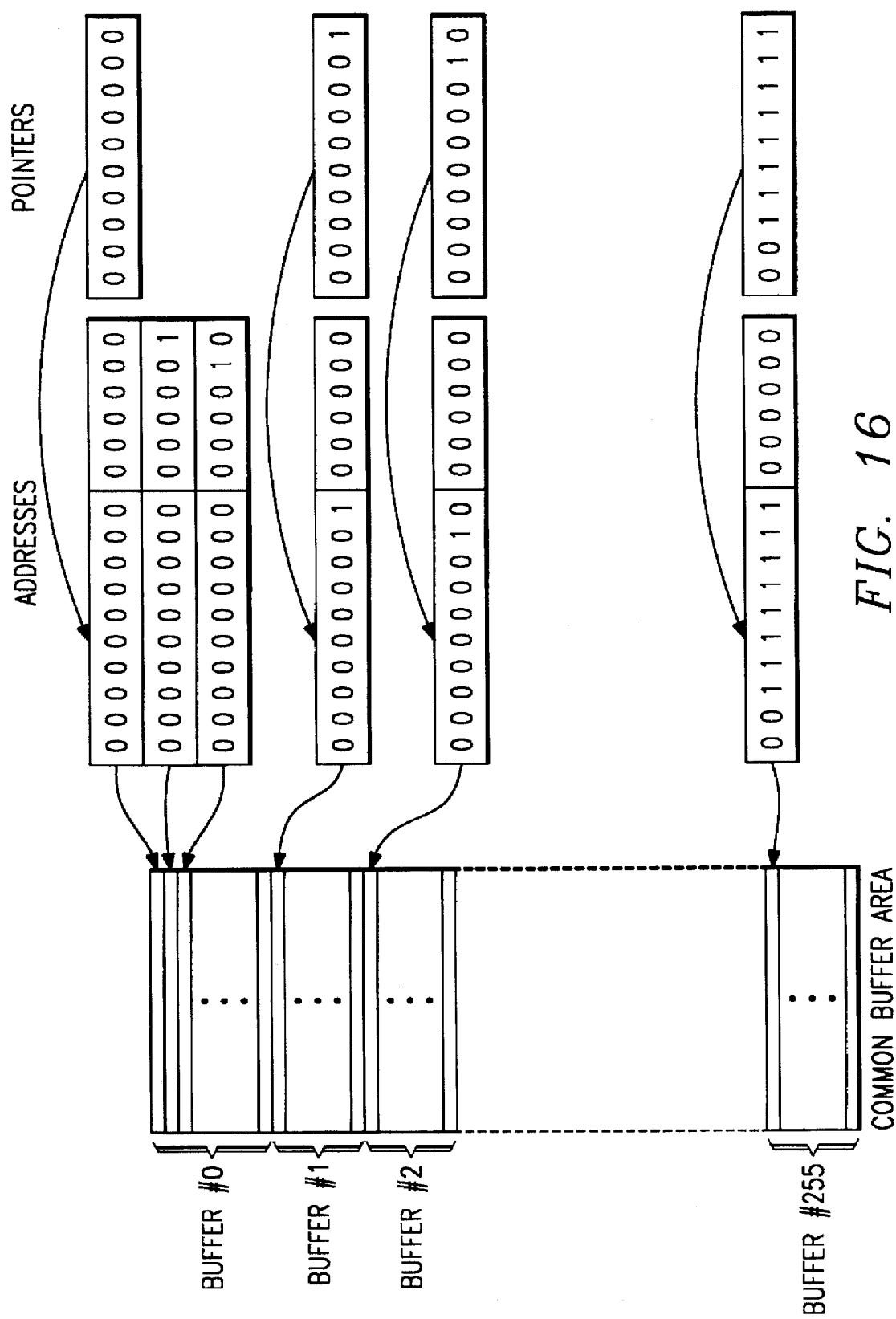
FIG. 16 illustrates a block diagram of a common buffer area of the vertical bar element.

FIG. 16 shows a partitioning of common buffer area 94. Addresses for common buffer area 94 are derived from buffer pointers that are a 10 bit representation of one buffer in common buffer area 94. A buffer pointer equals the ordinal number of the buffer it represents and it also equals the most significant bits of the RAM address of the buffer in common buffer area 94. A complete buffer address is made of the contents of its buffer pointer and a 6 bit least significant number equal to the sequential octet number of the segment stored in the buffer. Read and write operations of segments into and out of common buffer area 94 use complete buffer addresses generated from buffer pointers. Input selector 96 is responsible for write operations whereas read operations are controlled by a queue server state machine 106.

A buffer within common buffer area 94 may be in one of two states—free or busy. A free buffer is one that is available for use by any incoming segment. A busy buffer is one occupied by a segment of information waiting in the queue to be delivered. When a new segment comes in, a buffer is selected corresponding to the top buffer pointer within a free buffer pointer FIFO 100 for use by input selector 96. The sixty-four contiguous positions of a buffer are filled with the octets of the incoming segment. The write address used during this process is incremented by input selector 96 after every write operation.

Figure 17:
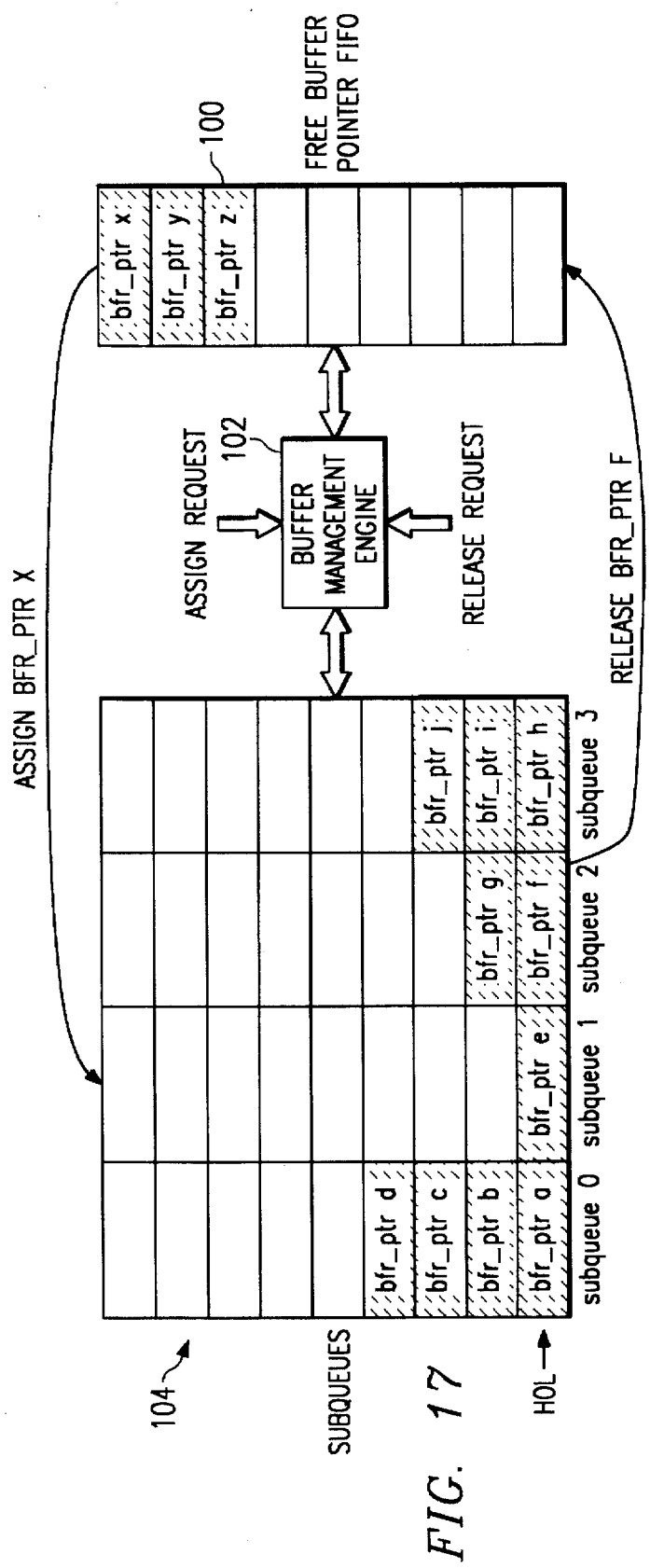
FIG. 17 illustrates an example of buffer management performed by the vertical bar element.

Buffer management engine 102 manages the pools of buffer pointers available to one queuing system 90 for segment storage. All buffer manipulations including enqueuing, dequeuing, etc. are performed on buffer pointers, not on the buffers themselves, by buffer management engine 102. FIG. 17 shows how buffer management engine 102 controls the buffer pointers. When a new segment is detected by input selector 96, a request for a free buffer is made in the form of a buffer pointer assign request signal from input selector 96 to buffer management engine 102 that includes the class of service of the segment to be enqueued. When the assign request signal comes in, buffer management engine 102 extracts the first available buffer pointer, in this example pointer $BFR_{13}$ PTR X, from the free buffer pointer FIFO 100.

Buffer management engine 102 builds the write memory address for common buffer area 94 from the value of BFR_PTR X and passes that address to input selector 96. Buffer management engine 102 then inserts pointer BFR_PTR X into the back of one of the four subqueues 104 according to the class of service of the segment, in this case pointer BFR_PTR X is placed in subqueue one. Pointer BFR_PTR X is linked to the previous buffer pointer in subqueue one, pointer BFR_PTR E. Pointers representing busy buffers are kept in one of the four subqueues 104 allocated to the four classes of service supported by ATM switch 10. Busy buffer pointers progress from the back of their subqueues to the front or head of line (HOL) position of the subqueue as segments are serviced by queue server state machine 106 and forwarded towards the next switching stage. Each of these subqueues operates independently of the others.

A buffer pointer is released by buffer management engine 102 after the segment is transmitted by queuing system state machine 106 out of vertical bar element 54. A serviced segment is removed from common buffer area 94 by queuing system state machine 106, either through forwarding towards the next stage or by discarding due to old age, error, or for any other reason. Once the segment is serviced, queuing system state machine 106 issues a release request signal to buffer management engine 102. The release request includes the subqueue number of the buffer pointer to be released, in this example subqueue number two. Once the release request is received, buffer management engine 102 extracts the buffer pointer at the HOL position of the subqueue, in this example pointer BFR_PTR F of subqueue 2. Pointer BFR_PTR F is inserted into the bottom of free buffer pointer FIFO 100 and is delinked from the next pointer BFR_PTR G in the subqueue. The latter pointer becomes the new HOL for subqueue two.

Queuing system state machine 106 incorporates two major types of state machine functions—a time stamping state machine 108 and a queue server state machine 110. Time stamping state machine 108 performs a time stamping/ segment aging algorithm on segments processed by queuing system 90. Queue server state machine 110 implements a first stage of a contention resolution tournament to determine which segment that is at the HOL position of the four subqueues is to compete against other winners in other queuing systems 90 throughout vertical bar element 54. Queue server state machine 110 forwards the age of the winning segment for participation in the second phase of the contention resolution tournament and receives the results of the second phase of the contention resolution tournament. If queue server state machine 106 has the winning segment of the second phase of the contention resolution tournament, a release request signal is sent to buffer management engine 102 to release the winning segments pointer from subqueue 104. Queue server state machine 110 also reads the winning segments data out of common buffer area 94 during the subsequent switching cycle.

Time stamping state machine 108 performs the time stamping process for queuing system 90 of vertical bar element 54. This process records the time of arrival of each segment into queuing system 90 by time stamping the segment when it comes in. At the time of departure of the segment from the queue, the difference between the time of arrival of the segment and its time of departure is calculated by time stamping state machine 108 and placed within the segment's TiSiS field. The difference between these two values is the actual time spent by the segment in the queue, also referred to as the age of the segment.

The age of a segment is measured as an integer number of switching intervals. The age, or time spent in system, of a segment is kept in the TiSiS field of the segment header. The age of a segment is a system wide variable. The age value increases cumulatively when the segment passes from one queuing system to the next queuing system in the matrix. The TiSiS field in the segment's header is not incremented while the segment is in the queuing system. Instead, the segment's age is calculated, with the help of external counters, as the difference between its time of arrival and its time of departure. In this way by not having to modify the segment's headers while they are in the queue, the processing requirements imposed on queuing system 90 are greatly reduced.

Age is the determining factor in the selection of a segment among a group of segments contending for output from vertical bar element 54. Age is the variable that decides which segment will be forwarded in case of output contention. When two or more segments at the head of different queuing systems 90 enter into a contention resolution tournament, the oldest segment, that is the one with the highest age value among the contenders, is selected. The tournament selection criteria assumes that the segment that has spent most time in the switching system as indicated by its highest age value is the one in greatest need to be switched and therefore is the one that must be chosen for delivery.

Since ATM switch 10 caters to multiple communications with different class of service requirements, the time that is spent in the system for a data segment is more critical to some services than to others. A system of priorities has been established such that the segments of time constrained connections are preferred over segments of less time constrained communications even when the segments of the high priority connection have spent less time in the system than the segments of low priority connection. A priority scheme capable of discriminating between the time related needs of the various servers as supported by ATM switch 10 can greatly reduce the switching delays and delay variations of time sensitive services such as video and voice, thus improving the performance of the switch and increasing its value to the users.

The switching delay requirements of the four classes of service supported by ATM switch 10 vary in increasing order of tolerable delay from lowest switching delay tolerance for class of service zero (the most demanding class) to highest switching delay for class of service three (the least demanding class). A time weighting factor, constant $\omega$, has been defined for each one of the four classes of services—a constant $\omega_0$ for segments of class of service zero, a constant $\omega_1$ for segments belonging to class of service one, etc. The values of these four constants may be programmable and passed to vertical bar elements 54 in switching elements 38 as an initialization parameter. In this scheme, the age of a segment will be calculated as the product of the constant $\omega$ by the actual number of switching intervals $\tau$ that the segment has spent enqueued in buffered crosspoint matrix 20.

For example, if the values of $\omega_0, \omega_1, \omega_2,$ and $\omega_3$ are 5, 4, 2, and 1, respectively, then the age of a class of service zero segment that spent five switching intervals in the queue will be 25, while the age of a segment having class of service three that has spent the same five switching intervals in the queue will be only 5. In this example, the class of service zero segment has aged five times faster than the class of service three segment. In this example, for the same amount of real time spent in the system, a class of service zero segment will be chosen over class of service one segment and so on.

The weighting factor $\omega$ for time demanding services is made larger than the $\omega$ constant of less time demanding services. A real time constrained segment will age faster than a non-real time segment, thus increasing its probability of being serviced out of queuing system 90 sooner. The mean and variance switching delays of the different classes of service can in this way be prioritized to better fit the quality of service description for each class of segments. This preferential aging technique does not prevent the delivery of low priority segments. The technique only delays the switching of slowly aging segments, but only if higher priority segments are present in the queue. This technique compares favorably with a strict head of line (HOL) servicing discipline, where for instance segments of CoS zero are always serviced first, regardless of how long packets of CoS one have been waiting in their queue. The strict HOL discipline is the "all or nothing" version of the weighted age algorithm.

To obtain the multiplication just described, four real time counters 112 are used, one for each class of service supported. At the start of every switching interval, the counters are incremented by their respective $\omega$ values. For example, if $\omega$ equals three, then the real time counter 112 associated with that $\omega$ value increases from zero to three to six, etc. The count kept by every real time counter 112 is therefore equal to the switching interval number already multiplied by the weighting factor for that class of service.

Figure 18:
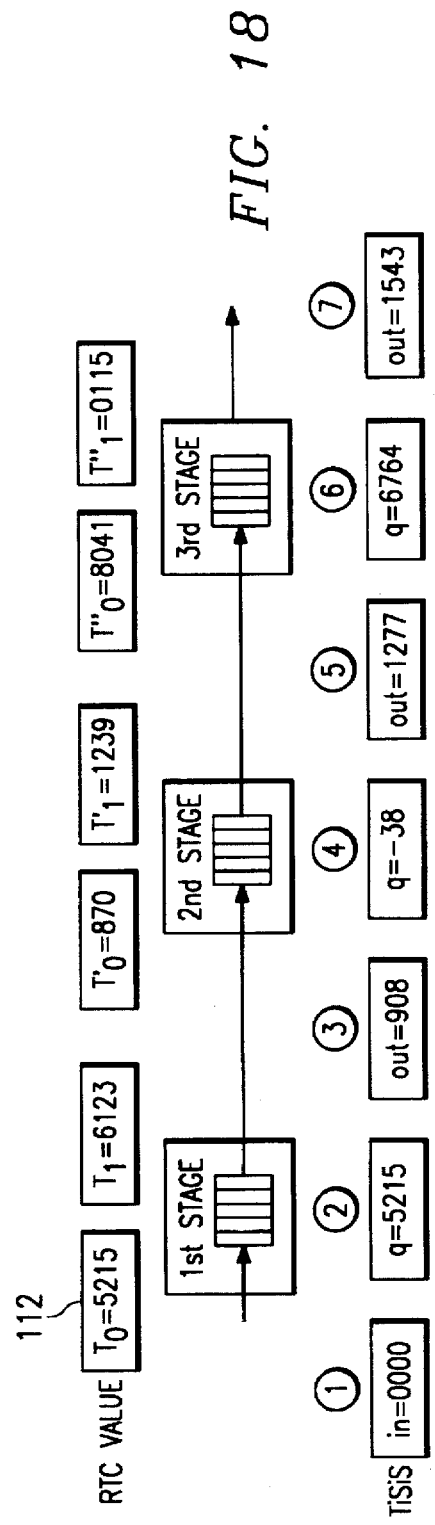
FIG. 18 illustrates an example of time stamping performed by the vertical bar element.

FIG. 18 shows an example of an implementation of the time stamping/aging algorithm executed by time stamp state machine 108 on the segments of one class of service. Identical algorithms are implemented in parallel by time stamp state machine 108 on the other three classes of service maintained by queuing system 90. The TiSiS field of the segment header is set up in this example as a 14 bit value to allow a range of numbers from $-8,192$ to $+8,191$ represented in two's complement form. The real time counter thus will revert to zero after reaching the upper limit of 8,191.

At the start of the switching interval, time stamp state machine 108 increments a real time counter 112 by the value of $\omega$ specified for this class of service. A reading of the real time counter produces a value $T_0$. Upon segment arrival, the value in the TiSiS field of the segment, $\Delta T_0$, is subtracted from the present value of the real time counter, $T_0$. The value $\Delta T_0$ is the accumulated age of the segment ($Age_\phi$) at the time it enters the queue and as such must be a positive integer number. The resulting value ($T_0 - \Delta T_0$), however, may be a negative number. In the example of FIG. 18, the value in the TiSiS field, $\Delta T_0$, is 0 since the segment is entering queuing system 90 for the first time and the TiSiS field has not been adjusted from its initial setting. The two's complement of the resulting value $T_0 - \Delta T_0$ is placed in the TiSiS field prior to writing a segment into common buffer area 94 and placing its buffer pointer in the appropriate subqueue 104. In the example of FIG. 18, the stored value is 5215.

The buffer pointer reaches the HOL position of its appropriate subqueue 104 at some time $T_1$. In the example of FIG. 18, $T_1$ equals 6123. $T_1$ may be lower than $T_0$ if real time counter 112 has rolled over prior to the time the buffer pointer of the segment reaches the HOL position of subqueue 104. The TiSiS field is read and the new accumulated age of the segment is calculated by subtracting the TiSiS field from the present real time counter value as follows. If $T_1$ is greater than $T_0$, the new accumulated age is $T_1-(T_0-\Delta T_0)$ which equals $\Delta T_1+\Delta T_0$, where $\Delta T_1$, is equal to $T_1-T_0$. If $T_1$ is less than $T_0$, the new accumulated age is $(T_1+8,192)-(T_0-\Delta T_0)$ which equals $\Delta T_1+\Delta T_0$ where $\Delta T_1$ is equal to $T_1+8,192-T_0$. $\Delta T_1$ represents the part of the weighted age incurred by the segment while inside queuing system 90. The segment is then entered into the first phase of the contention resolution tournament with the new age $\Delta T_1+\Delta T_\phi$ calculated above. In the example of FIG. 18, the new age is 908.

During the first phase of the contention resolution tournament, the new accumulated age of the segment for this class of service is compared to the accumulated ages of the other three class of service segments in the HOL position of all subqueues 104. If the segment wins the tournament, the new accumulated age of the segment, $\Delta T_1+\Delta T_0$, is forwarded to the second phase of the contention resolution tournament to compete against winning segments of other queuing systems 90 of vertical bar element 54. If the segment wins this second phase, the accumulated age value is rewritten into the TiSiS field of the segment and the segment is transmitted out of common buffer area 94 for output from vertical bar element 54.

If the segment does not win, the TiSiS field is not modified and the algorithm is repeated at the start of the next switching interval to determine the new accumulated age. The segment reenters the first phase of the contention resolution tournament to compete again against the segments at the HOL positions of subqueue 104. The age of the segment is automatically increased by the new value of $T_1$ without the need to modify the TiSiS field. The algorithm is repeated for every vertical bar element 54 travelled by the segment from one end of buffered crosspoint matrix 20 to the other. FIG. 18 shows an example of the value of the real time counter and the TiSiS field of a segment aging process through the remaining stages of buffered crosspoint matrix 20.

The oldest segment of each queuing system 90, defined as the segment with the largest calculated age value among the heads of the four subqueues 104, is chosen. In case of a tie between two or more age values, the segment with the highest priority class of service is selected.

The second phase of the contention resolution tournament is performed by an output selector 114. The ages of the winners of the first phase of the contention resolution tournament are placed on a contention resolution bus 116 by respective queuing system state machines 106, in addition to the age of the segment within an expansion buffer 118, if any. Output selector 114 chooses the highest age value from the age values placed on contention resolution bus 116 by queuing systems 90 and by expansion buffer 118. Upon determining the most aged segment of vertical bar element 54, output selector 114 informs the appropriate queue server state machine 110 of queuing system state machine 106 or expansion buffer 118 that it has the winning segment. Queuing system state machine 106 or expansion buffer 118 proceed in turn to forward the winning segment at the start of the next switching interval for placement onto output multiplexer 120.

Output selector 114 activates output multiplexer 120 to let the selected segment pass. Output selector 114 generates a $\phi_{out}$ synchronization signal at the start of the switching interval during which a segment is forwarded from output multiplexer 120. Output selector 114 receives a back pressure signal $bp_{out}$ which is used in case multiple switching elements 38 are vertically combined in one column for crossbar expansion. Selection of a segment to be forwarded to a next switching element is inhibited when back pressure signal $bp_{out}$ is active.

During switching intervals in which back pressure signal $bp_{out}$ is active, output selector 114 will not implement the second stage contention resolution tournament and will not forward a winning segment to the next switching element 38. In the case of a tie during the second phase of the contention resolution tournament, the segment in expansion buffer 118 would be selected first. If no segment is stored in expansion buffer 118, then those segments having the same age value from the various queuing systems 90 are selected at random. This selection process, where the age of the segment, weighted by its delay priority, is the sole determining factor in resolving contentions between segments competing for the same output, allows for matrix expansion in an equitable way since the age value is carried system-wide. In this manner, the most deserving segment is always switched first, regardless of matrix size, or which port, including expansion ports, the segment appeared.

In summary, a switching matrix within an ATM switch receives segments containing ATM cells at a plurality of switching elements. Each switching element has a plurality of multicast/routing elements for receiving and routing segments to crosspoints in one or more vertical bar elements within each switching element. Each vertical bar element has a plurality of queuing systems, containing a plurality of crosspoints. A first phase contention resolution tournament is performed in each queuing system to determine the oldest segment of those segments at the head of subqueues associated with different classes of service. Age weighting is performed on segments according to the class of service priority. Each vertical bar element performs a second phase contention resolution tournament to find the most aged segment for each vertical bar element from the oldest segments of each queuing system. The most aged segment for each vertical bar element becomes the output for its corresponding vertical bar element.

Thus, it is apparent that there has been provided in accordance with the present invention, a switching matrix for an asynchronous transfer mode switch and method of operation that satisfy the advantages set forth above. Although the preferred embodiment has been described in detail, it should be understood that various changes, substitutions, and alterations can be made herein. For example, the use of fields within a segment may be applied differently than described here while still maintaining the proper switching results through the matrix. Other examples are readily ascertainable by one skilled in the art and can be made herein without departing from the spirit and scope of the present invention as defined by the following claims.

What is claimed is:

1. A switching element for use in a buffered crosspoint matrix of an asynchronous transfer mode switch, comprising:

a plurality of multicast/routing elements for receiving separate segments, said segments including asynchronous transfer mode cells; and a plurality of vertical bar elements coupled to each multicast/routing element for receiving said segments from said multicast/routing elements, each vertical bar element receiving said segments at a plurality of crosspoints, said multicast/routing elements generating insert enable signals according to individual and group address information within said segments to determine which crosspoints of said vertical bar elements are to receive said segments, each segment having a weighted age indicating a length of time and a priority within the vertical bar elements, the weighted age increasing at a faster rate for segments having a higher priority than for segments having a lower priority, each vertical bar element outputting a selected segment according to the weighted age of said selected segment.

2. A vertical bar element of a switching element in a buffered crosspoint matrix of a telecommunications switch, comprising:

a plurality of elastic stores each operable to receive a traffic segment;

a common buffer area operable to store traffic segments received at the plurality of elastic stores;

an input selector operable to control storage of a received traffic segment from each of the plurality of elastic stores into the common buffer area;

a plurality of subqueues operable to store buffer locations within the common buffer area of traffic segments therein, each subqueue representing a unique class of service supported by the telecommunications switch, each subqueue having a separate time weighting factor indicating a priority of the class of service supported by each subqueue, the input selector operable to identify the class of service of the received traffic segment;

a buffer management engine operable to identify an available buffer location for the received traffic segment, the buffer management engine operable to initiate storage of the received traffic segment into the common buffer area at the available buffer location, the buffer management engine operable to enqueue the available buffer location into an appropriate subqueue according to the class of service of the received traffic segment identified by the input selector.

3. The vertical bar element of claim 2, wherein the input selector selects traffic segments for insertion into the common buffer area at switching intervals, each of the plurality of elastic stores operable to receive its traffic segment any time between switching intervals.

4. The vertical bar element of claim 3, wherein the input selector inserts traffic segments from the plurality of elastic stores into the common buffer area in a fair and equitable manner.

5. The vertical bar element of claim 4, wherein the input selector uses a cyclical entry order of elastic stores adjusted each switching interval to provide insertion in a fair and equitable manner.

6. The vertical bar element of claim 4, wherein each received traffic segment is inserted into the common buffer area during a separate insertion phase of each switching interval.

7. The vertical bar element of claim 2, wherein switching timing is detached from traffic segment arrivals.

8. The vertical bar element of claim 2, further comprising:

a queue system state machine operable to control transfer of traffic segments out of the common buffer area, the queuing system state machine including a time stamp state machine operable to insert a time stamp into each traffic segment indicating a time of arrival into the common buffer area, the queue system state machine including a queue server state machine operable to resolve output contentions among traffic segments awaiting transfer from the common buffer area, the queue system state machine including a plurality of counters, each counter associated with one of the plurality of subqueues, each counter operable to increment at each switching interval according to the time weighting factor of its associated subqueue, the counter having a value at a beginning of the switching interval that is combined with the time of arrival to produce the time stamp for traffic segments entering the common buffer area.

9. The vertical bar element of claim 8, wherein the queue server state machine is operable to identify buffer locations at a top of each of the plurality of subqueues, the queue server state machine operable to determine which one of the buffer locations at the top of each of the plurality of subqueues is associated with the traffic segment stored in the common buffer area having a greatest weighted age based on a weighted time spent by the traffic segments within the vertical bar element as determined by the plurality of counters.

10. The vertical bar element of claim 9, wherein the queue server state machine is operable to send a release signal to the buffer management engine, the queue server state machine operable to transfer the traffic segment having the greatest weighted age out of the common buffer area, the buffer management engine operable to release the buffer location associated with the traffic segment having the greatest weighted age in response to the release signal, the released buffer location being made available to store another received traffic segment.

11. The vertical bar element of claim 10, wherein the time stamp state machine updates the time stamp of the transferred traffic segment in response to a value in an associated counter.

12. The vertical bar element of claim 2, wherein the traffic segments are modified asynchronous transfer mode cells.

* * * * *